US012756083B2

(12) United States Patent
Brookes et al.

(10) Patent No.: US 12,756,083 B2
(45) Date of Patent: Oct. 6, 2026

(54) TRANSMITTING ELECTROMAGNETIC SIGNALS OVER AN INTERFACE TRANSITION REGION BETWEEN INTEGRATED CIRCUIT DEVICE PLANES

(71) Applicant: Ciena Corporation, Hanover, MD (US)

(72) Inventors: Gregory Brookes, Québec (CA); Etienne Therriault, Québec (CA); Charbel Matta, Québec (CA); Maxime Jacques, Montreal (CA)

(73) Assignee: Ciena Corporation, Hanover, MD (US)

( * ) Notice: Subject to any disclaimer, the term of this patent is extended or adjusted under 35 U.S.C. 154(b) by 100 days.

(21) Appl. No.: 18/918,494

(22) Filed: Oct. 17, 2024

(65) Prior Publication Data

US 2026/0066515 A1 Mar. 5, 2026

Related U.S. Application Data

(63) Continuation-in-part of application No. 18/816,721, filed on Aug. 27, 2024.

(51) Int. Cl.
*H01P 3/08* (2006.01)

(52) U.S. Cl.
CPC .................................... *H01P 3/08* (2013.01)

(58) Field of Classification Search
CPC .. H01P 3/08; H01P 3/081; H01P 5/028; H01P 1/184; H01P 5/10; H01P 5/185; H01P 5/12; H01P 5/16; H01P 5/187; H01P 1/18; H01P 5/107; H01P 1/2039; H01P 1/047; H01P 5/184; H01P 3/085; H01P 3/026;

(Continued)

(56) References Cited

U.S. PATENT DOCUMENTS 6,192,167 B1 2/2001 Kissa et al.
6,522,793 B1 2/2003 Szilagyi et al.

(Continued)

OTHER PUBLICATIONS

Wen-Jun Lu et al., "A Broadband Transition Design for a Conductor-Backed Coplanar Waveguide and a Broadside Coupled Stripline", in IEEE Microwave and Wireless Components Letters, vol. 22, No. 1, pp. 10-12, Jan. 2012, DOI: 10.1109/LMWC.2011.2176724.

(Continued)

*Primary Examiner* — John W Poos
(74) *Attorney, Agent, or Firm* — Young Basile Hanlon & MacFarlane P.C.

(57) ABSTRACT

In one aspect, in general, an apparatus comprises: a first interface comprising one or more edge-coupled coplanar striplines distributed along a first axis, where each edge-coupled coplanar stripline comprises at least two conductor strips; a second interface comprising one or more edge-coupled striplines distributed along a second axis, where each edge-coupled stripline comprises at least three conductor strips; and a transition region between the first interface and the second interface, the transition region comprising a transition structure comprising different respective conductors connecting each conductor strip of an edge-coupled coplanar stripline of the first interface to one or more respective conductor strips of a corresponding edge-coupled stripline of the second interface, wherein at least a portion of the transition structure comprises broad-side coupled conductors.

20 Claims, 12 Drawing Sheets

(58) Field of Classification Search

CPC .. H01P 3/003; H01P 1/203; H01P 5/08; H01P 5/02; H01P 1/20381; H01P 5/085; H01P 5/04; H01P 1/2005; H01P 3/16; H01P 3/082; H01P 11/003; H01P 1/20; H01P 1/2013; H01P 5/087; H01P 7/082; H01P 3/006; H01P 3/00; H01P 3/088; H01P 5/022; H01P 1/16; H01P 1/2002; H01P 1/20345; H01P 7/10; H01P 1/20363; H01P 5/1007; H01P 1/2135; H01P 1/04; H01P 11/001; H01P 3/06; H01P 3/121; H01P 1/205; H01P 1/2088; H01P 1/213; H01P 3/04; H01P 3/18; H01P 5/00; H01P 5/22; H01P 7/084; H01P 1/207; H01P 1/30; H01P 1/387; H01P 3/12; H01P 5/227; H01P 7/04; H01P 1/122; H01P 1/127; H01P 1/185; H01P 1/218; H01P 11/00; H01P 3/087; H01P 3/122; H01P 5/183; H01P 7/08; H01P 7/086; H01P 1/02; H01P 1/2053; H01P 1/212; H01P 1/2133; H01P 11/005; H01P 11/007; H01P 3/165; H01P 5/1015; H01P 5/18; H01P 5/181; H01P 5/182; H01P 5/188; H01P 5/19; H01P 5/20; H01P 1/10; H01P 1/15; H01P 1/161; H01P 1/182; H01P 1/201; H01P 1/2056; H01P 1/2136; H01P 1/36; H01P 11/002; H01P 3/02; H01P 3/084; H01P 3/10; H01P 3/123; H01P 5/026; H01P 5/103; H01P 5/186; H01P 7/00; H01P 7/005; H01P 7/06; H01P 9/006; H01P 1/00; H01P 1/12; H01P 1/162; H01P 1/20327; H01P 1/20336; H01P 1/20372; H01P 1/2086; H01P 1/209; H01P 1/227; H01P 11/008; H01P 7/105; H01P 9/00; H10W 44/216; H10W 44/20; H10W 90/724; H10W 70/685; H10W 90/00; H10W 70/65; H10W 70/611; H10W 90/701; H10W 74/15; H10W 44/248; H10W 90/734; H10W 72/00; H10W 90/754; H10W 70/68; H10W 70/635; H10W 72/20; H10W 72/5445; H10W 42/20; H10W 72/072; H10W 72/252; H10W 70/05; H10W 74/00; H10W 44/209; H10W 70/614; H10W 44/501; H10W 72/07236; H10W 70/60; H10W 20/423; H10W 44/251; H10W 44/601; H10W 72/07232; H10W 72/241; H10W 72/29; H10W 90/401; H10W 20/40; H10W 44/206; H10W 72/01253; H10W 72/07233; H10W 72/07237; H10W 72/07251; H10W 72/248; H10W 72/253; H10W 72/874; H10W 72/884; H10W 74/117; H10W 90/759; H10W 44/212; H10W 44/234; H10W 70/63; H10W 72/075; H10W 90/22; H10W 90/293; H10W 42/00; H10W 20/49; H10W 44/226; H10W 70/652; H10W 72/352; H10W 90/722; H10W 70/095; H10W 72/877; H10W 72/90; H10W 20/425; H10W 20/4441; H10W 20/48; H10W 72/012; H10W 72/07331; H10W 72/325; H10W 72/926; H10W 72/932; H10W 74/012; H10W 20/20; H10W 20/43; H10W 40/10; H10W 72/9415; H10W 90/288; H10W 42/267; H10W 44/223; H10W 44/241; H10W 70/093; H10W 72/01; H10W 72/244; H10W 72/5522; H10W 74/114; H10W 90/20; H10W 90/297; H10W 90/732; H10W 44/231; H10W 70/415; H10W 70/481; H10W 72/07553; H10W 72/07554; H10W 72/533; H10W 72/534; H10W 72/536; H10W 72/5363; H10W 72/5366; H10W 72/537; H10W 72/5475; H10W 72/701; H10W 72/9413; H10W 90/721; H10W 90/736; H10W 90/756; H10W 20/023; H10W 20/0245; H10W 20/2134; H10W 20/42; H10W 40/22; H10W 40/228; H10W 40/43; H10W 44/00; H10W 46/00; H10W 46/301; H10W 70/09; H10W 70/655; H10W 70/682; H10W 72/01255; H10W 72/0198; H10W 72/07227; H10W 72/07255; H10W 72/221; H10W 72/2528; H10W 72/50; H10W 72/5473; H10W 72/5524; H10W 72/5525; H10W 72/823; H10W 72/879; H10W 72/923; H10W 72/931; H10W 72/942; H10W 80/00; H10W 80/301; H10W 90/10; H10W 90/24; H10W 90/26; H10W 90/752; H10W 90/755; H10W 90/794; H10W 99/00; H10W 20/01; H10W 20/056; H10W 20/4484; H10W 42/121; H10W 44/255; H10W 72/222; H10W 72/242; H10W 72/951; H10W 76/40; H10W 90/753; H01Q 1/38; H01Q 1/243; H01Q 21/065; H01Q 21/28; H01Q 1/48; H01Q 1/246; H01Q 21/24; H01Q 1/2283; H01Q 1/50; H01Q 9/0407; H01Q 9/0421; H01Q 21/0075; H01Q 3/36; H01Q 5/42; H01Q 1/36; H01Q 9/045; H01Q 1/24; H01Q 23/00; H01Q 21/08; H01Q 21/26; H01Q 9/42; H01Q 9/0414; H01Q 9/285; H01Q 1/523; H10K 59/40; H10K 59/131; H10K 59/873; H10K 2102/311; H10K 77/111; H10K 59/126; H10K 50/84; H10K 59/00; H10K 59/122; H10K 59/88; H10K 59/12; H10K 50/115; H10K 50/844; H10K 59/1213; H10K 59/123; H10K 59/124; H10K 59/1315; H10K 59/35; H10K 59/38; H10K 59/80516; H10K 59/80518; H10K 59/878; H10K 59/879; H10K 59/8792; H10K 59/90; H10K 77/10; H03H 7/38; H03H 7/0138; H03H 1/0007; H03H 2001/0085; H03H 7/427; H03H 7/48; H03H 7/40; H03H 7/09; H03H 7/42; H03H 11/04; H03H 11/22; H03H 11/362; H03H 7/0107; H03H 7/46; H03H 9/6423; H03H 11/344; H03H 2001/0014; H03H 3/00; H03H 7/01; H03H 7/185; H03H 7/422; H03H 7/468; H03H 11/32; H03H 7/0115; H03H 7/1708; H03H

7/1725; H03H 7/1766; H03H 7/1775; H03H 7/1783; H03H 7/24
See application file for complete search history.

(56) References Cited

U.S. PATENT DOCUMENTS

| | | | | |
|---|---|---|---|---|
| 2011/0037178 | A1* | 2/2011 | Sun | H10W 44/20 174/133 R |
| 2011/0037532 | A1* | 2/2011 | Lascari | H05K 1/0222 333/27 |
| 2013/0147580 | A1* | 6/2013 | Nagai | H01F 38/14 333/204 |
| 2016/0172736 | A1* | 6/2016 | Hash | H01P 5/184 333/112 |
| 2019/0094648 | A1 | 3/2019 | Williams et al. | |
| 2022/0197104 | A1 | 6/2022 | Miyazaki et al. | |
| 2022/0404680 | A1 | 12/2022 | Jacques et al. | |
| 2023/0305356 | A1 | 9/2023 | Jacques et al. | |

OTHER PUBLICATIONS

Kim, Young-Gon, Kim, Kang Wook, "Design of an Ultra-Wideband Transition from Double-Sided Parallel Stripline to Coplanar Waveguide", International Journal of Antennas and Propagation, 2013, 921859, 8 p. 2013. DOI: 10.1155/2013/921859 <https://doi.org/10.1155/2013/921859>.

P. L. Carro and J. de Mingo, "Analysis and Synthesis of Double-Sided Parallel-Strip Transitions", in IEEE Transactions on Microwave Theory and Techniques, vol. 58, No. 2, pp. 372-380, Feb. 2010, DOI: 10.1109/TMTT.2009.2038454.

D. E. Anagnostou et al., "A 0-55-GHz Coplanar Waveguide to Coplanar Strip Transition", in IEEE Transactions on Microwave Theory and Techniques, vol. 56, No. 1, pp. 1-6, Jan. 2008, Doi: 10.1109/TMTT.2007.911909.

Yong-Hyun Baek et al., "94-GHz Log-Periodic Antenna on GaAs Substrate Using Air-Bridge Structure", in IEEE Antennas and Wireless Propagation Letters, vol. 8, pp. 909-911, 2009, DOI: 10.1109/LAWP.2009.2025523.

P. Hantula et al., "A 3-dB Quadrature Coupler Using Broadside Striplines for FM Power Amplifiers", 2018 IEEE International Workshop on Electromagnetics:Applications and Student Innovation Competition (iWEM), Nagoya, Japan, 2018, pp. 1-2, DOI: 10.1109/IWEM.2018.8536606.

Benedikt Baeuerle et al., "120 GBd plasmonic Mach-Zehnder modulator with a novel differential electrode design operated at a peak-to-peak drive voltage of 178 mV", Opt. Express, vol. 27, No. 12, p. 16823-16832, 2019, DOI: 10.1364/OE.27.016823.

A.A. Saadi et al., "Low-loss broadband (DC to 220 Ghz) S-CPW to S-CPS transition for S-CPS coplanar probing", Electronics Letters, vol. 55, No. 21, pp. 1137-1139, Oct. 17, 2019, DOI: 10.1049/el.2019.2377.

G. H. Lee et al., "Asymmetric Ultra-Wideband Microstrip-to-Coplanar Stripline Transition", in IEEE Microwave and Wireless Components Letters, vol. 28, No. 5, pp. 386-388, May 2018, DOI: 10.1109/LMWC.2018.2822723.

* cited by examiner

TRANSMITTING ELECTROMAGNETIC SIGNALS OVER AN INTERFACE TRANSITION REGION BETWEEN INTEGRATED CIRCUIT DEVICE PLANES

CROSS-REFERENCE TO RELATED APPLICATION(S)

This application is a continuation-in-part of U.S. application Ser. No. 18/816,721, entitled "TRANSMITTING ELECTROMAGNETIC SIGNALS BETWEEN INTEGRATED CIRCUIT DEVICES AND SIGNAL CARRYING STRUCTURES," filed Aug. 27, 2024, the entire disclosure of which is incorporated herein by reference.

TECHNICAL FIELD

This disclosure relates to transmitting electromagnetic signals over an interface transition region between integrated circuit device planes.

BACKGROUND

As electrical, opto-electrical (OE) and electro-optic (EO) devices increase in complexity and performance, so does the demand for smaller device footprints driven by co-packaging. A strategy for reducing device footprints and packaging sizes to stay within industry needs of increased performance and decreased power consumption can involve optimizing device design by bringing integrated circuit (IC) components as close together as possible.

SUMMARY

In one aspect, in general, an apparatus comprises: a first interface comprising a first set of transmission lines distributed along a first axis that is contained within a first plane, the first set of transmission lines comprising a first conductor strip and a second conductor strip that are distributed along the first axis and are substantially coplanar with the first plane; a second interface comprising a second set of transmission lines distributed along a second axis that is contained within a second plane, wherein the second set of transmission lines comprises a third conductor strip, a fourth conductor strip, and a fifth conductor strip that are distributed along the second axis, and the second plane is substantially parallel to the first plane; and a transition region between the first interface and the second interface, the transition region comprising a first coupling location coplanar with the first plane, a second coupling location coplanar with the first plane and positioned at a different distance from the second interface than the first coupling location, a first transition structure comprising a first conductor, wherein at least a portion of the first conductor extends to a first distance from the first plane and the first conductor connects the first coupling location to the third conductor strip, and a second conductor, wherein at least a portion of the second conductor extends to a second distance from the first plane and the second conductor connects the second coupling location to the fourth conductor strip and the fifth conductor strip, and a second transition structure comprising a third conductor coplanar with the first plane and connecting the second coupling location to the second conductor strip, and a fourth conductor coplanar with the first plane and connecting the first coupling location to the first conductor strip; wherein at least a portion of the second conductor and at least a portion of the first conductor at least partially overlaps with a third plane that is perpendicular to the second axis.

Aspects can include one or more of the following features.

The third conductor and the fourth conductor are configured to at least partially compensate for a delay associated with electromagnetic signals propagating through one or more of: the first transition structure, the first conductor strip, the second conductor strip, the third conductor strip, the fourth conductor strip, or the fifth conductor strips.

At least a second portion of the second conductor extends to a third distance from the second plane.

The first interface and the second transition structure comprise a first material having a first dielectric constant, the first transition structure comprises a second material having a second dielectric constant, and the second interface comprises a third material having a third dielectric constant.

The first dielectric constant, the second dielectric constant, and the third dielectric constant are different and the third conductor and the fourth conductor are configured to at least partially compensate for a delay associated with electromagnetic signals propagating through the first material, the second material, and the third material.

The second dielectric constant and the third dielectric constant are equal.

Each of the third conductor strip, the fourth conductor strip, and the fifth conductor strip comprise a respective capacitor.

Each of the first conductor and the second conductor comprise a respective capacitor.

The first coupling location is arranged along a third axis that is coplanar with the first plane and substantially parallel to an axis that contains the portion of the second conductor that overlaps with the portion of the first conductor in the third plane.

The second coupling location is arranged along the third axis.

The portion of the second conductor that overlaps with the first conductor in the third plane comprises a y-branch structure configured to distribute a signal propagating in the second conductor to the fourth conductor strip and the fifth conductor strip.

The first coupling location and the second coupling location each comprise respective metal contacts.

The second axis is substantially parallel to the first axis.

The third conductor strip is configured to carry a first signal and each of the fourth conductor strip and the fifth conductor strip are configured to carry a respective second signal and third signal, where the second signal and the third signal are complementary signals of the first signal.

The second set of transmission lines comprises a first ground strip and a second ground strip that are substantially coplanar with the second plane and arranged along the second axis.

In another aspect, in general, a method comprises: forming a first interface comprising a first set of transmission lines distributed along a first axis that is contained within a first plane, the first set of transmission lines comprising a first conductor strip and a second conductor strip that are distributed along the first axis and are substantially coplanar with the first plane; forming a second interface comprising a second set of transmission lines distributed along a second axis that is contained within a second plane, wherein the second set of transmission lines comprises a third conductor strip, a fourth conductor strip, and a fifth conductor strip that are distributed along the second axis, and the second plane is substantially parallel to the first plane; and forming a transition region between the first interface and the second interface, the transition region comprising a first coupling location coplanar with the first plane, a second coupling location coplanar with the first plane and positioned at a different distance from the second interface than the first coupling location, a first transition structure comprising a first conductor, wherein at least a portion of the first conductor extends to a first distance from the first plane and the first conductor connects the first coupling location to the third conductor strip, and a second conductor, wherein at least a portion of the second conductor extends to a second distance from the first plane and the second conductor connects the second coupling location to the fourth conductor strip and the fifth conductor strip, and a second transition structure comprising a third conductor coplanar with the first plane and connecting the second coupling location to the second conductor strip, and a fourth conductor coplanar with the first plane and connecting the first coupling location to the first conductor strip; wherein at least a portion of the second conductor and at least a portion of the first conductor at least partially overlaps with a third plane that is perpendicular to the second axis.

Aspects can include one or more of the following features.

The third conductor and the fourth conductor are configured to at least partially compensate for a delay associated with electromagnetic signals propagating through one or more of: the first transition structure, the first conductor strip, the second conductor strip, the third conductor strip, the fourth conductor strip, or the fifth conductor strips.

At least a second portion of the second conductor extends to a third distance from the second plane.

The first coupling location is arranged along a third axis that is coplanar with the first plane and substantially parallel to an axis that contains the portion of the second conductor that overlaps with the portion of the first conductor in the third plane.

In another aspect, in general, an apparatus comprises: a first interface comprising one or more edge-coupled coplanar striplines distributed along a first axis, where each edge-coupled coplanar stripline comprises at least two conductor strips; a second interface comprising one or more edge-coupled striplines distributed along a second axis, where each edge-coupled stripline comprises at least three conductor strips; and a transition region between the first interface and the second interface, the transition region comprising a transition structure comprising different respective conductors connecting each conductor strip of an edge-coupled coplanar stripline of the first interface to one or more respective conductor strips of a corresponding edge-coupled stripline of the second interface, wherein at least a portion of the transition structure comprises broadside coupled conductors.

Aspects can have one or more of the following advantages.

The methods and systems described herein comprise a connector configured to transmit electromagnetic signals between an integrated circuit device comprising multiple transmission lines and a signal carrying structure comprising multiple transmission lines. Some connector configurations can facilitate the manufacture and production of devices with reduced physical footprints and greater device performance. The reduced footprint can allow for more space for other electro-optical components. Some connector configurations can also allow for electromagnetic conduction channels with reduced lengths, which can also reduce signal conduction losses such as mode conversion, intra-channel skew, and crosstalk.

In some implementations, the methods and systems described herein can be utilized to configure a connector structure that can carry a high bandwidth and/or high frequency signal. Some connector structures can be associated with reduced power consumption. Some connector structures can be associated with reduced conduction losses of a high bandwidth and/or high frequency signal. In some examples, use of a connector structure can allow a differential-output driver to drive an electro-optical modulator comprising a coplanar waveguide (CPW) in a push-pull configuration.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Some electrical, EO, or OE devices can comprise multiple components that include transmission lines configured to carry or transmit electromagnetic signals, such as radiofrequency (RF) signals. For example, components with transmission lines can include integrated circuit chips, electro-optical chips, and signal carrying structures. In some devices, RF transmission lines can be interconnected across multiple components. In these devices, matching the pitch and spacing of RF transmission lines between components can be a consideration in optimizing device performance and footprints. For instance, matching the interconnected pitch of RF transmission lines can reduce electrical loss while also reducing device packaging sizes to stay within industry standards.

Some transmission lines comprise two or more conductors over which electromagnetic signals are transmitted. Some transmission lines are configured to transmit signals using a single ended configuration, where one of the conductors transmits a signal while the other conductor is grounded. Some transmission lines can be configured to transmit an electromagnetic signal by transmitting a pair of differential electromagnetic signals. These differential transmission lines can comprise a pair of conductor strips wherein one conductor strip carries a signal that is antiphase with a signal carried by the other conductor strip. In some implementations, differential transmission lines also include one or more grounded conductor strips.

Some transmission lines can have an edge-coupled coplanar stripline (ECCPS) configuration comprising a pair of conductor strips that are arranged to be substantially coplanar with a plane. Some transmission lines can have a broadside-coupled stripline (BCS) configuration wherein one conductor strip in a pair of conductor strips is arranged along an axis that is perpendicular to a plane that is coplanar with the other conductor strip. In some implementations the conductor strips of a BCS transmission line are completely overlapping with each other when viewed along that axis, as in some of the examples illustrated and described herein. But, in other examples, the conductor strips are not necessarily completely overlapping, but may be at least partially overlapping.

Figure 1A:
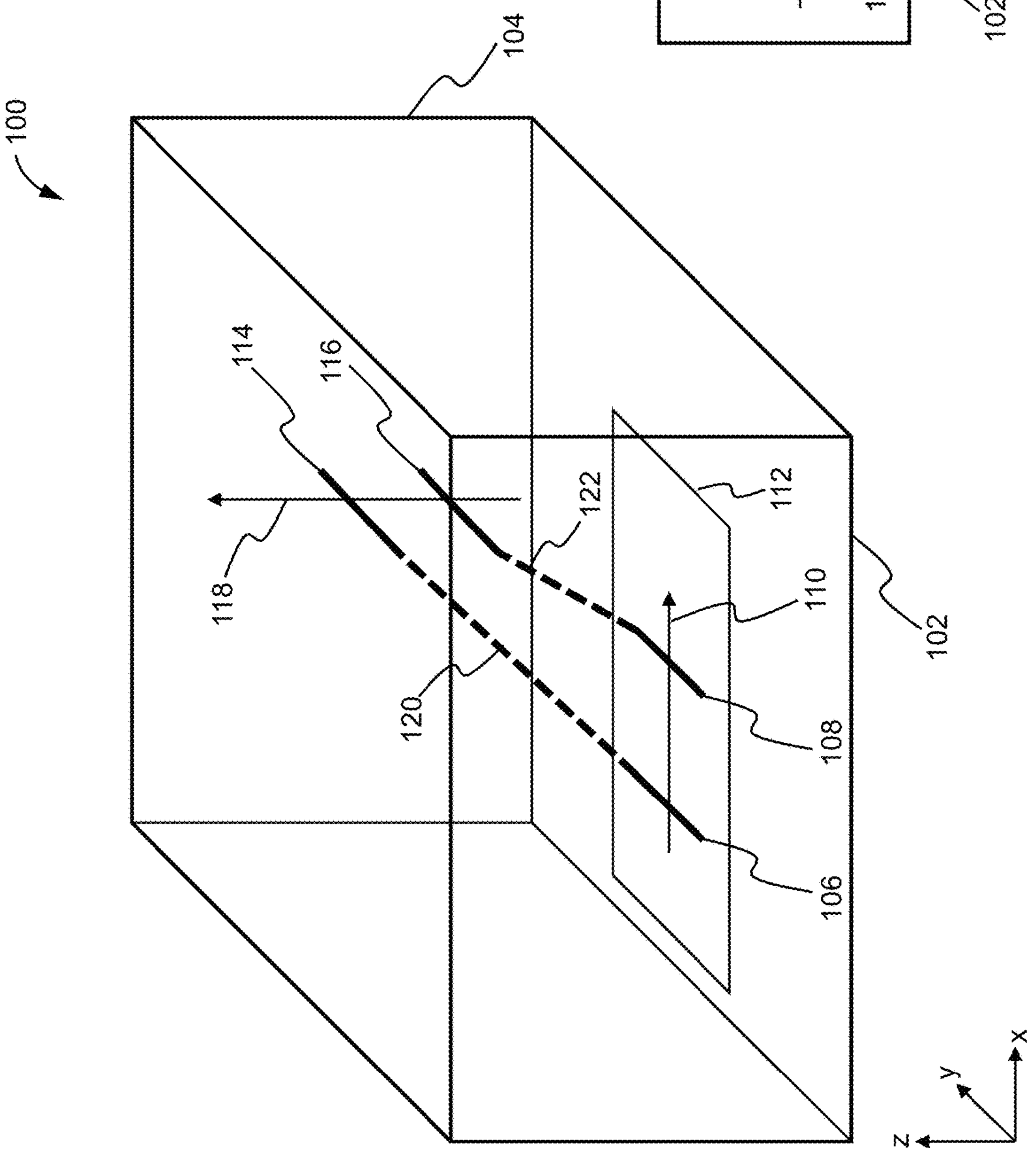
FIGS. 1A-1C are schematic diagrams of an example connector structure for integrated circuit devices and signal carrying structures.
Figure 1B:
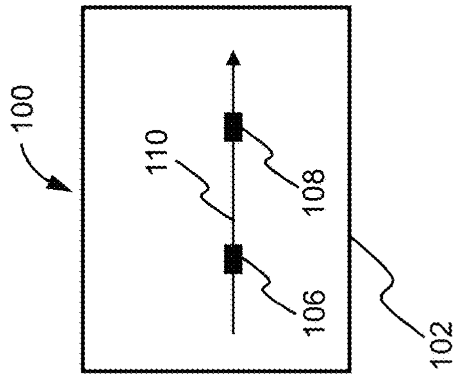
Figure 1C:
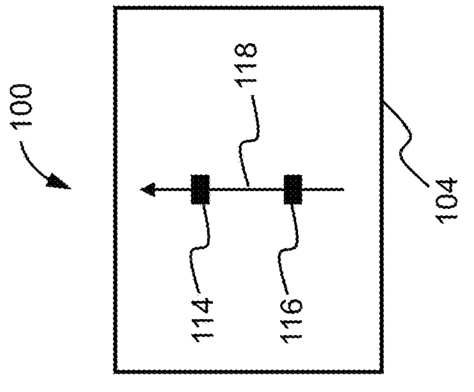

Some electrical, EO, or OE devices can comprise an integrated circuit device with an ECCPS transmission line that is connected to a BCS transmission line in a signal carrying structure. In such devices, a connector structure can be utilized to connect the conductor strips of the ECCPS transmission line to the conductor strips of the BCS transmission line. FIG. 1A depicts an isometric view of an example connector structure 100 with a first interface 102 configured to connect to an integrated circuit device and a second interface 104 configured to connect to a signal carrying structure. FIG. 1B depicts a front view of the example connector structure 100 and the first interface 102. The first interface 102 comprises a conductor strip 106 and a conductor strip 108 that are arranged along an axis 110. In this example, the axis 110 is parallel to the x-axis of a coordinate system shown in the lower left corner of FIG. 1A. The conductor strips 106 and 108 and the axis 110 are coplanar with a plane 112. FIG. 1C depicts a back view of the example connector structure 100 and the second interface 104. The second interface 104 comprises a conductor strip 114 and a conductor strip 116 that are arranged along an axis 118 that is perpendicular to the axis 110. In this example, the axis 118 is parallel to the z-axis of the coordinate system shown in the lower left corner of FIG. 1A. Between the first interface 102 and the second interface 104 is a transition region comprising a conductor 120 and a conductor 122. The conductor 120 connects the conductor strip 106 with the conductor strip 114 while the conductor 122 connects the conductor strip 108 with the conductor strip 116. In some example systems, the transition region can comprise a pair of conductors connecting conductor strip 106 with conductor strip 116 and conductor strip 108 with conductor strip 114.

Figure 2C:
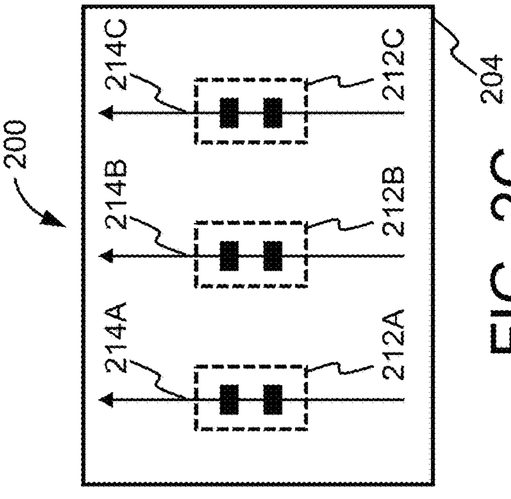
FIGS. 2A-2C are schematic diagrams of an example connector structure for integrated circuit devices and signal carrying structures.
Figure 2B:
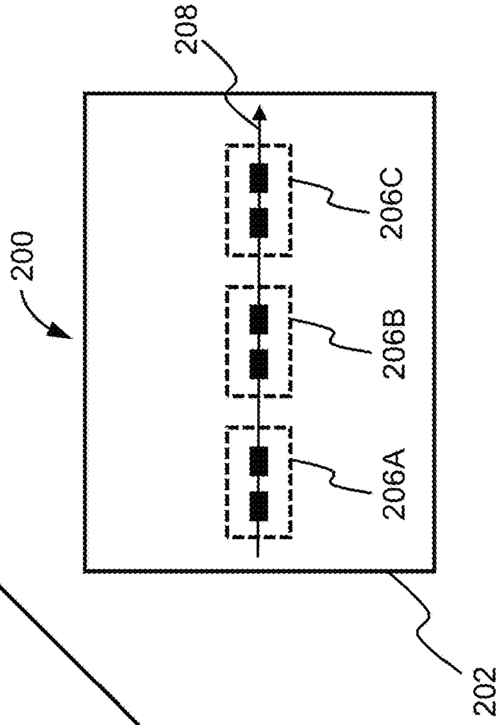
Figure 2A:
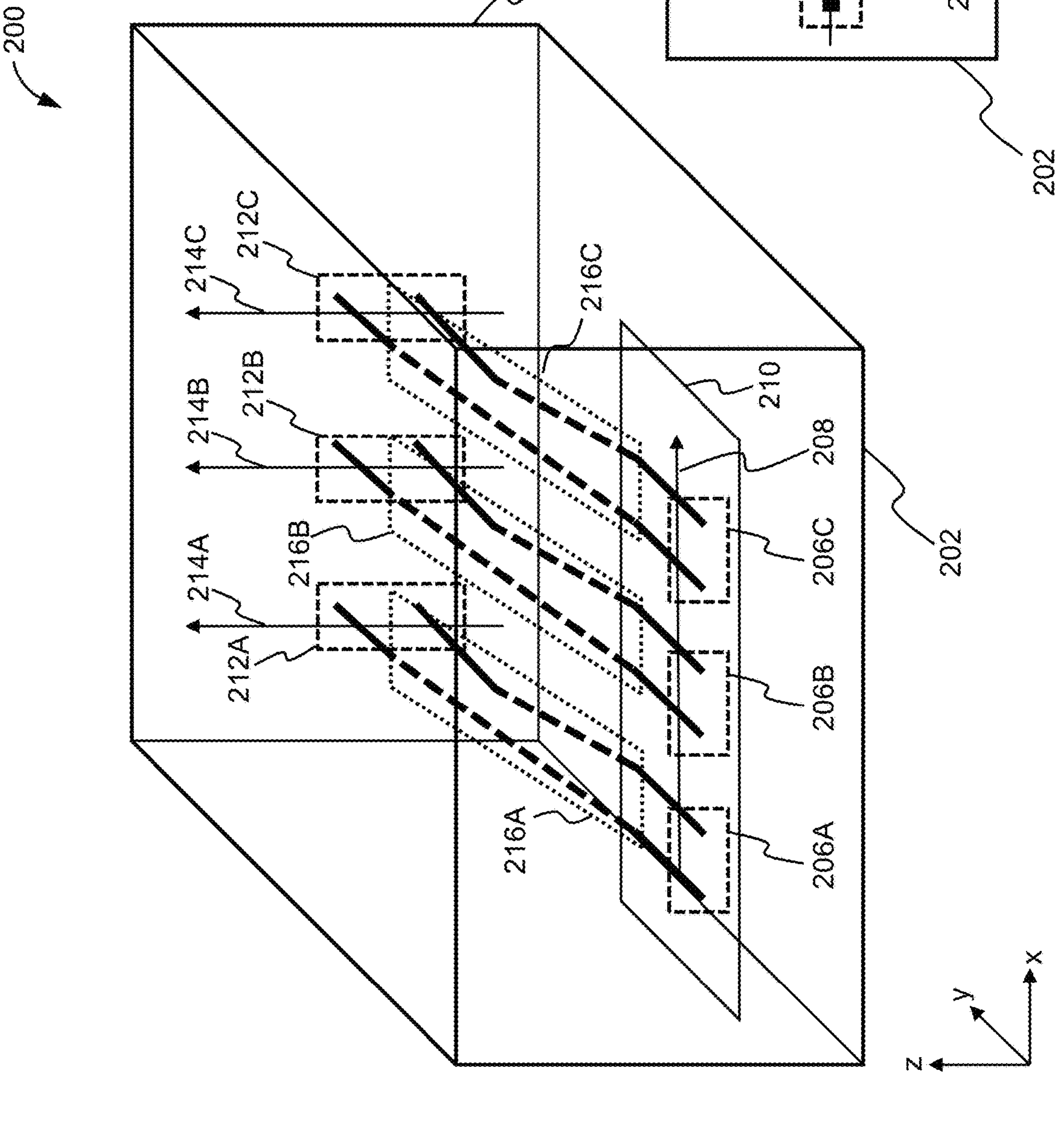

An electrical, EO, or OE device can comprise an integrated circuit device with a plurality of ECCPS transmission lines that are each connected to a respective one of a plurality of BCS transmission lines in a signal carrying structure by a connector structure. FIG. 2A depicts an isometric view of an example connector structure 200 with a first interface 202 configured to connect to an integrated circuit device and a second interface 204 configured to connect to a signal carrying structure. FIG. 2B depicts a front view of the example connector structure 200 and the first interface 202. The first interface 202 comprises a plurality of device coupling transmission lines (DCTLs) 206A, 206B, 206C that each comprise a pair of conductor strips. The DCTLs 206A, 206B, 206C are arranged along a first axis 208 and are coplanar with a plane 210. FIG. 2C depicts a back view of the example connector structure 200 and the second interface 204. The second interface 204 comprises a plurality of signal carrying structure coupling transmission lines (SCSCTLs) 212A, 212B, 212C that each comprise a pair of conductor strips that are arranged along axes 214A, 214B, 214C, respectively. The axes 214A, 214B, 214C are perpendicular to the first axis 208. Between the first interface 202 and the second interface 204 is a transition region comprising a plurality of transition structures 216A, 216B, 216C. Each transition structure 216A, 216B, 216C comprises different respective conductors connecting each conductor strip of a DCTL 206A, 206B, 206C to a respective conductor strip of a corresponding SCSCTL 212A, 212B, 212C.

In some connector structures, each DCTL can comprise at least two conductor strips that are distributed along the first axis 208 and are coplanar with the plane 210. In some connector structures, each signal carrying structure connector transmission line can comprise at least two conductor strips that are distributed along the axes 214A, 214B, 214C.

Without using some of the connector features described herein that enable compact connector configurations, a fanning connector configuration may comprise ECCPS transmission lines associated with an integrated circuit device that are coupled to ECCPS transmission lines associated with a signal carrying structure. In some fanning connector configurations, the conductor strips in the ECCPS transmission line of the intergrated circuit device have a different pitch than the conductor strips in the ECCPS transmission line of the signal carrying structure. In these fanning connector configurations, a "fan-in" portion of a connector including conductor strips with different pathlengths and bends can be utilized to connect the wider ECCPS transmission lines of the signal carrying structure (e.g., a cable) to the narrower ECCPS transmission lines of the device. This fanning connector configuration can be associated unwanted and adverse consequences including: (1) reduced useful area in package (2) increased conduction losses (3) increased skew (intra and inter-channel) (4) increased mode conversion (5) increased crosstalk. Such fanning connector configuration can occupy a considerable area in a device package, drastically limiting the space for other components. This size requirement can be a considerable limitation in implementing EO components such as a Mach-Zehnder modulator, as a component's performance can be proportional to the length of the component. Longer lines due to this fan-in can lead to additional losses associated with propagation of the electromagnetic wave, e.g., conduction and dielectric losses. The fanning connector configuration can also be associated with a difference in length between bends of conductor strips that comprise a transmission line, resulting in inter-channel skew. Additionally, the bends required in the fan-in leads to intra-channel skew as the length of the two electrodes (PN skew), causing common-mode conversion. Extra transmission line length associated with a fanning connector configuration can lead to additional inter-channel crosstalk as the interaction length increases. These processes can introduce delays between signals traveling in each conduction strip that can be difficult to compensate in small device packages. Furthermore, edge-coupled coplanar lines can be sensitive to the width of the signal conductors and the width of the grounds between two channels.

In contrast, utilizing a connector structure configured to couple a plurality of ECCPS transmission lines with a plurality of BCS transmission lines can be associated with a reduced physical footprint and improved device capabilities. For instance, a connector structure can be configured to have a width similar to a width associated with an integrated circuit device and a width associated with a signal carrying structure. This design can allow for more space to include other electrical, EO, or OE components within a device, which can increase transmission throughput or allow other functionalities to be added. In addition, a high density of components within a device can decrease the complexity of thermal management solutions and any associated power consumption. A ECCPS-BCS connector structure can also comprise shorter conductor line lengths than a ECCPS-ECCPS transition, which can decrease losses associated with conduction and crosstalk. Further, a connector structure can be configured to include conductors with short bends, which can reduce mode conversion and intra-channel skew compared to other configurations. Some conductors can also be configured to have similar lengths, reducing inter-channel skew compared to other configurations. These loss reductions can result in less digital signal processing power being allocated for compensation and towards other application-specific integrated circuit functions.

Interfaces can be configured to suppress signal crosstalk between adjacent transmission lines. For example, some connector structures can comprise a first interface that is configured to couple to an integrated circuit device that is also configured to suppress signal crosstalk between conductor strips in a DCTL. In some implementations, the first interface can comprise ground stitching wirebonds from outside grounds associated with the DCTLs. Some connector structures can comprise a second interface that is configured to couple to a signal carrying structure that is also configured to suppress signal crosstalk between conductor strips in a SCSCTL. Some second interfaces configured to suppress crosstalk can comprise ground material between conductor strips. In some implementations, the ground material can have a thickness that is associated with a desired signal impedance and the dimensions of the conductor strips. As described in detail later with respect to FIGS. 7A-7C, some interfaces configured to suppress signal crosstalk between conductor strips in transmission lines can include ground vias.

Balancing signal delays associated with signals propagating through transmission lines configured to carry electromagnetic signals can be a consideration when designing devices. Signal delays can arise from physical properties of materials associated with a device and from differences in the pathlengths of channels in a transmission lines. Some devices can include integrated circuit devices comprising materials associated with one or more dielectric constants and signal carrying structures comprising materials associated with one or more dielectric constants. In some configurations, these materials can be similar to each other such that the associated dielectric constants are equal. Other configurations can include materials that are different from each other such that the associated dielectric constants are not equal. In some devices, the integrated circuit devices and signal carrying structures can be formed from multiple layers of materials wherein each material is associated with a dielectric constant. In these configurations, signals propagating through transmission lines associated with the materials can acquire some delay associated with the different dielectric constants. This propagation delay can be adjusted by reducing or increasing the length and/or width of transmission lines in the connecting structure, the anti-pads, or the transitions in both materials.

Figures 3A, 3B, 3C, 3D, 3E, 3F:
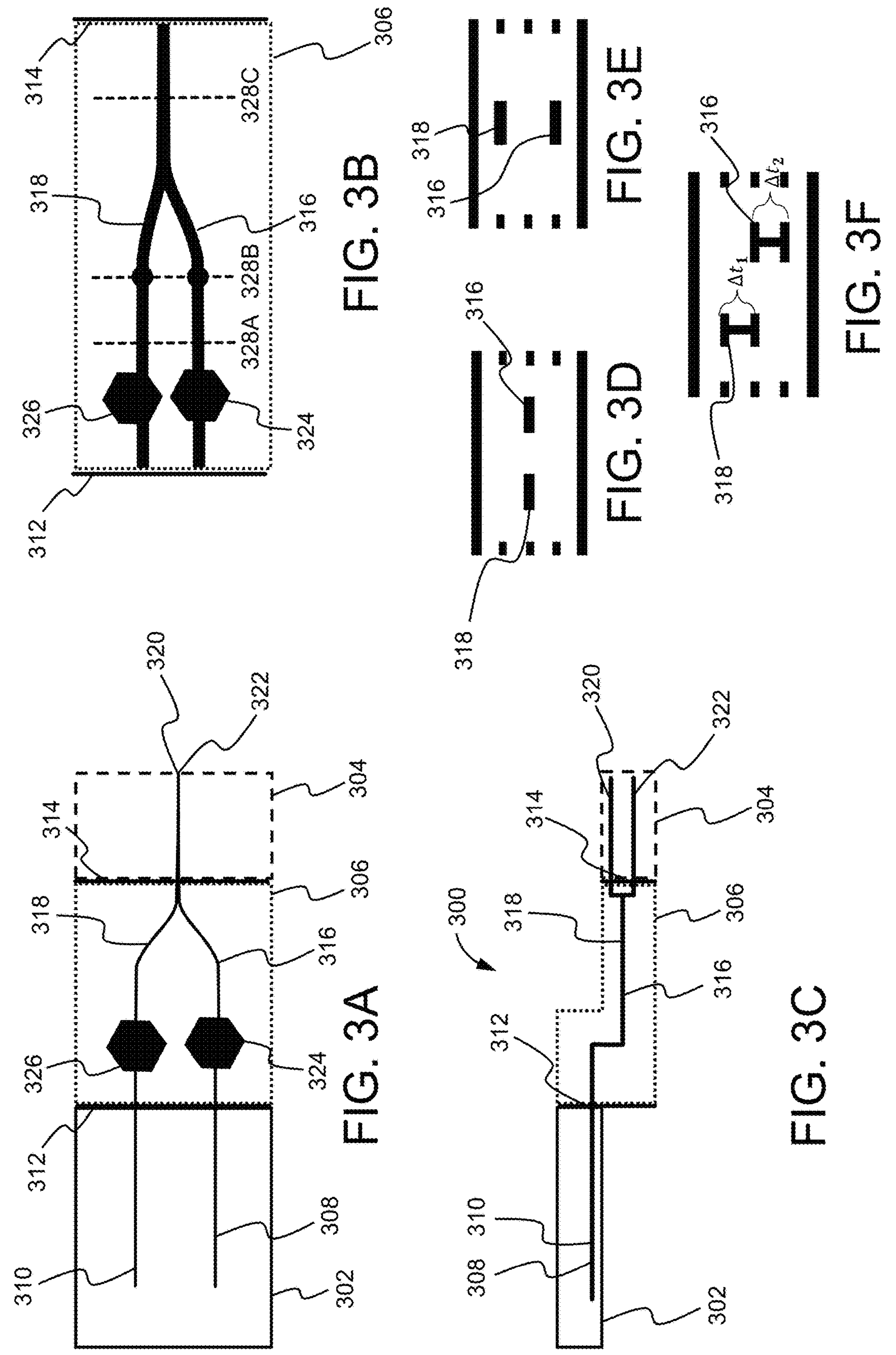
FIGS. 3A-3F are schematic diagrams of an example device connected to a signal carrying structure.

Some connector structures can incorporate conductors designed to compensate for signal delays associated with electromagnetic signals propagating through the transition region. FIG. 3A depicts a top view of an example device 300 comprising an integrated circuit device 302 connected to a signal carrying structure 304 by a connector structure 306. A side view of the example device 300 is depicted in FIG. 3C. The integrated circuit device 302 comprises a conductor strips 308 and 310 arranged in an ECCPS configuration. The signal carrying structure 304 comprises conductor strips 320 and 322 arranged in a BCS configuration. FIG. 3B depicts a top view of the connector structure 306. The connector structure 306 comprises a first interface 312 configured to couple to the integrated circuit device 302 and a second interface 314 configured to couple to the signal carrying structure 304. The connector structure 306 comprises a conductor 316 connecting conductor strip 308 to conductor strip 322 and a conductor 318 connecting conductor strip 310 to conductor strip 320. Between the first interface 312 and the second interface 314, a transition region of connector structure 306 contains coupling locations 324 and 326 to which conductors 316 and 318 are respectively connected. In some implementations, the coupling locations 324, 326 can be contact pads configured to provide electrical connections between two substrates coupled together (e.g., in a flip-chip configuration), where a first substrate includes the conductor strips 308, 310 and the second substrate contains the conductor strips 316, 318. FIG. 3D depicts a two-dimensional perspective view of the transition structure 306 at plane 328A. FIG. 3E depicts a two-dimensional perspective view of the transition structure at plane 328C. FIG. 3F depicts a two-dimensional perspective view of the transition structure at plane 328B. As shown FIGS. 3D-3F, conductors 316 and 318 have geometries to facilitate the transition between conductor strips 308 and 310 having an ECCPS configuration and conductor strips 320 and 322 having a BCS configuration. Conductors 316 and 318 are also configured such that the vertical transitions compensate for any delays $\Delta t_1$, $\Delta t_2$ associated with signals propagating in the conductors.

Figures 4A, 4B, 4C, 4D, 4E, 4F:
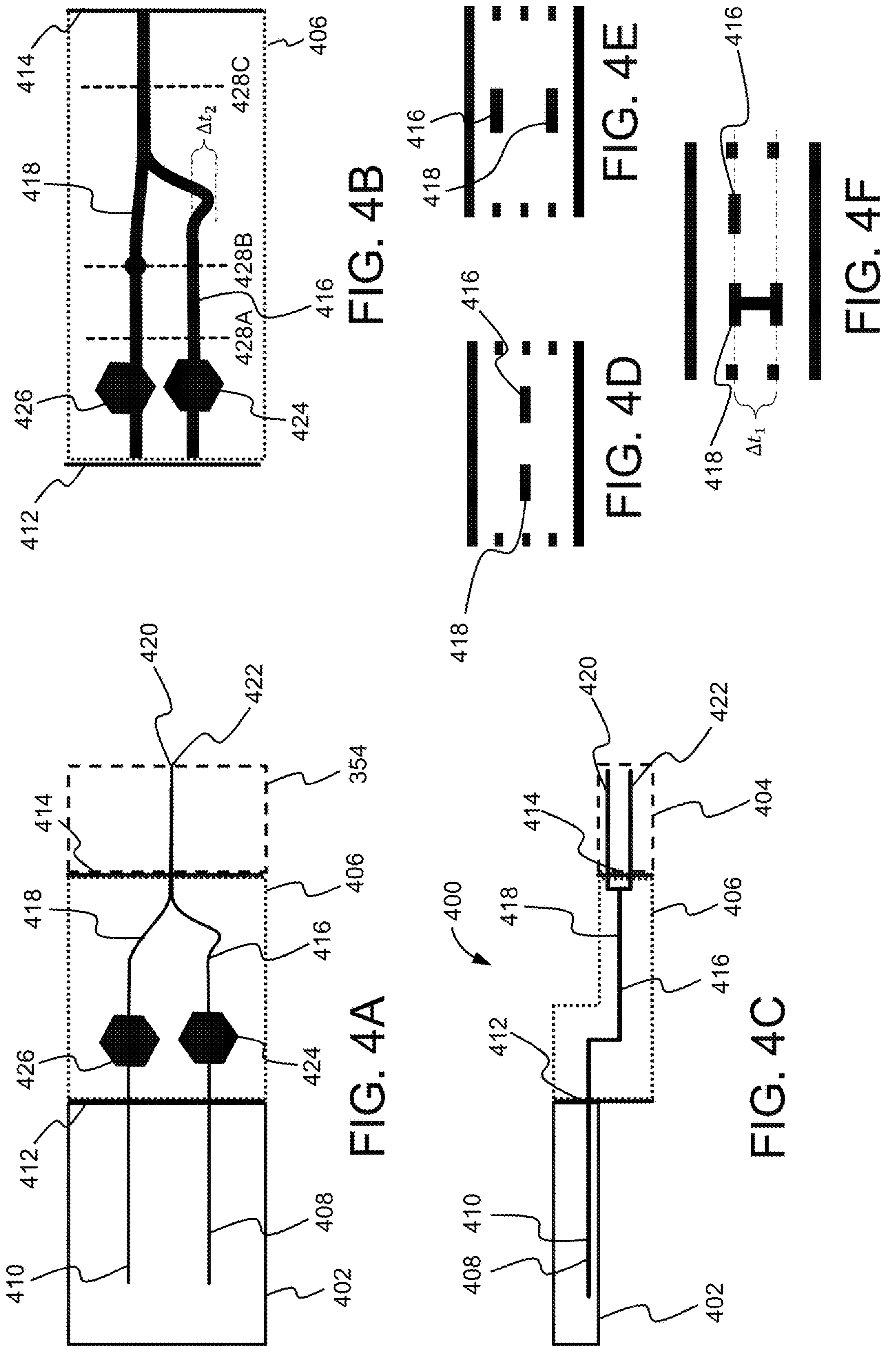
FIGS. 4A-4F are schematic diagrams of an example device connected to a signal carrying structure.

FIG. 4A depicts a top view of an example device 400 comprising an integrated circuit device 402 connected to a signal carrying structure 404 by a connector structure 406. FIG. 4C depicts a side view of the example device 400. The integrated circuit device 402 comprises a conductor strips 408 and 410 arranged in an ECCPS configuration. The signal carrying structure 404 comprises conductor strips 420 and 422 arranged in a BCS configuration. The connector structure 406 comprises a first interface 412 configured to couple to the integrated circuit device 402 and a second interface 414 configured to couple to the signal carrying structure 404. FIG. 4B depicts a top view of the connector structure 406. The connector structure 406 comprises a conductor 416 connecting conductor strip 408 to conductor strip 420 and a conductor 418 connecting conductor strip 420 to 422. Between the first interface 412 and the second interface 414, a transition region of connector structure 406 contains conductor pads 424 and 426 to which conductors 416 and 418 are respectively connected. FIG. 4D depicts a two-dimensional perspective view of the transition structure 406 at plane 428A. FIG. 4E depicts a two-dimensional perspective view of the transition structure at plane 428C. FIG. 4F depicts a two-dimensional perspective view of the transition structure at plane 428B. As shown in FIGS. 4D-4F, conductors 416 and 418 have geometries to facilitate the transition between conductor strips 408 and 410 having an ECCPS configuration and conductor strips 420 and 422 having a BCS configuration. Conductor 416 is configured to have a bend that is associated with a signal delay, $\Delta t_2$, to compensate for a signal delay associated with a vertical transition in conductor 418, $\Delta t_1$.

Figure 5A:
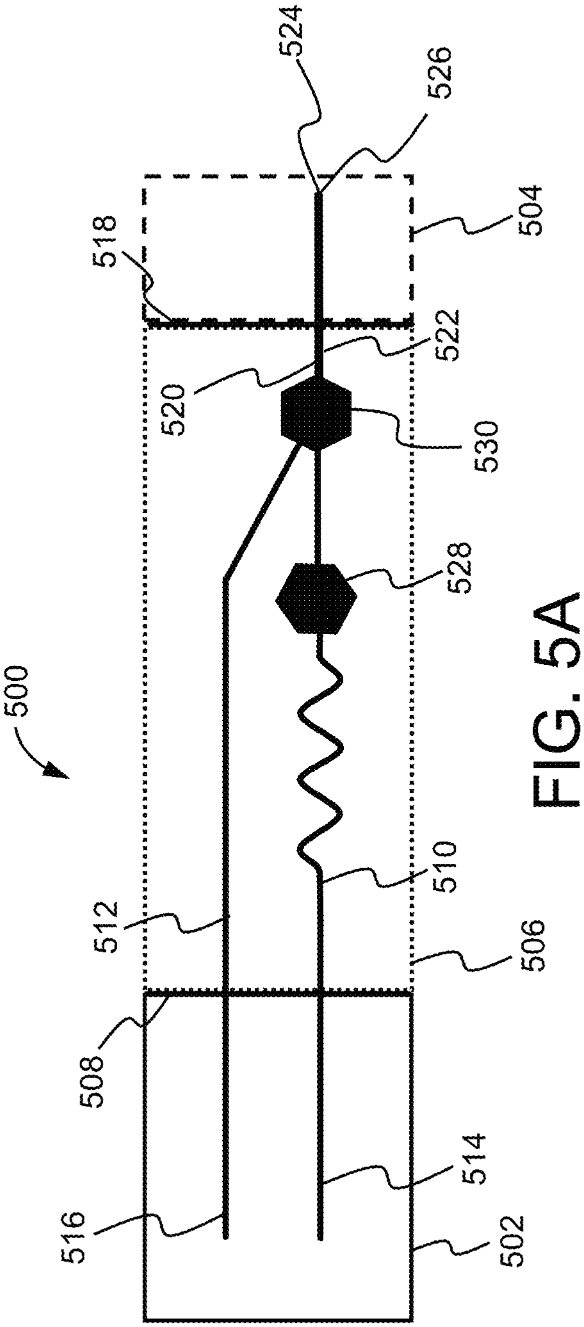
FIGS. 5A-5B is schematic diagrams of an example connector structure for integrated circuit devices and signal carrying structures.
Figure 5B:
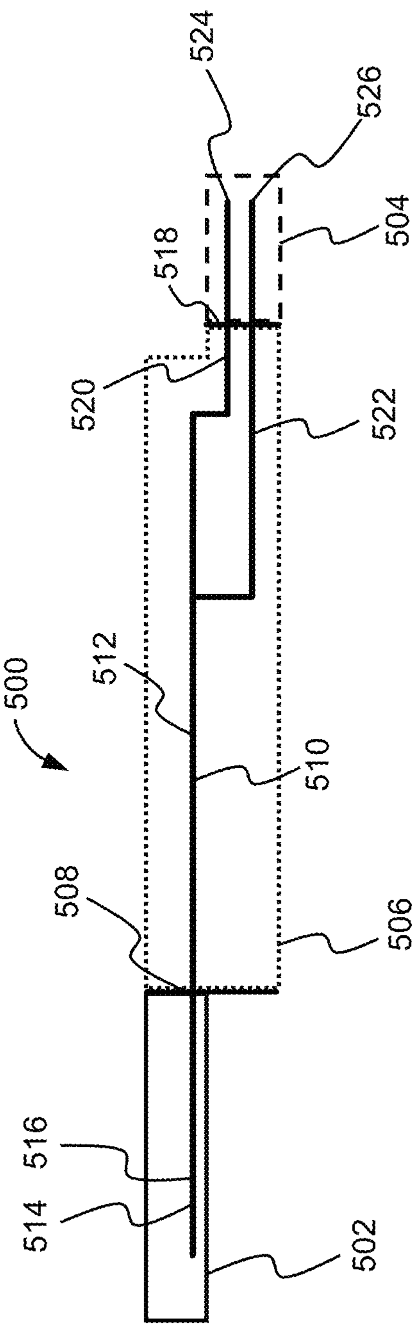

Some connector structures can comprise DCTLs configured to compensate for delays associated with electromagnetic signals propagating in transmission lines. FIG. 5A depicts a top view and FIG. 5B depicts a side view of an example device 500 comprising an integrated circuit device 502 connected to a signal carrying structure 504 by a connector structure 506. The connector structure 506 has a first interface 508 comprising conductor strips 510 and 512 that are configured to couple to conductor strips 514 and 516 of the integrated circuit device 502. Conductor strips 510, 512, 514, and 516 are substantially coplanar with a first plane. The connector structure 506 has a second interface 518 comprising conductor strips 520 and 522 that are configured to couple to conductor strips 524 and 526 of the signal carrying structure 504. Conductor strips 524 and 526 are distributed along an axis that is substantially perpendicular to the first plane. Between the first interface 508 and the second interface 518, the conductor structure 506 comprises a transition region containing a coupling location 528 that is coplanar with the first plane and a coupling location 530 that is coplanar with the first plane and positioned closer to the second interface 518 than the first coupling location. The conductor strip 522 extends to a first distance from the first plane and connects the coupling location 528 to the conductor strip 526. The conductor strip 520 extends a second distance from the first plane and connects the coupling location 530 to the conductor strip 524. The conductor strip 510 connects the coupling location 528 to the conductor strip 514 while the conductor strip 512 connects the coupling location 530 to the conductor strip 516. The length of the conductor strip 510 is based at least in part on the length of the conductor strip 512 and the difference between a length of the conductor strip 522 and a length of the conductor strip 520.

Some conductor strips can comprise materials such as aluminum, gold, copper, or tungsten. The dimensions of conductor strips can be adjusted depending on available fabrication techniques or signal transmission parameters. Some connector structures can be optimized for a given impedance.

Some integrated circuit devices can be photonic integrated circuit devices or electronic integrated circuit devices. Non-limiting examples of integrated circuit devices include application specific integrated circuits (ASICs) or field-programmable gate arrays (FPGAs). Integrated circuit devices may include or otherwise provide digital signal processors (DSPs), digital-to-analog converters (DACs) and analog-to-digital converters (ADCs), for example.

Some integrated circuit devices can be formed printed circuit boards (PCBs) or substrate like PCBs (SLPs). Some integrated circuit devices can be formed on a flexible PCBs. Some integrated circuit devices can comprise materials such as glass, LTCC, or semiconductor dies.

Some signal carrying structures can be cables configured to carry RF signals between devices. Some signal carrying structures can comprise substrates comprising a host material with embedded transmission lines. Some substrates can be high-density build-up (HDBU) substrates. Some substrates can comprise host materials such as high temperature co-fired ceramic (HTCC) or passivation layers comprising materials such as silicon dioxide, ceramics, organic materials, glass and glass-like materials such as sapphire or diamond, or polymers.

Following a transition structure, some devices can incorporate other components or structures to interface with BCS transmission lines. For instance, some devices can incorporate a chain of multiple components, each comprising transmission lines with a BCS configuration, following a transition structure. This configuration could comprise additional delay lines to compensate any delays associated with the conductor line pitch of the components. This configuration can allow for narrower channel pitch on each component of the chain, thus achieving smaller form factor.

Figure 6A:
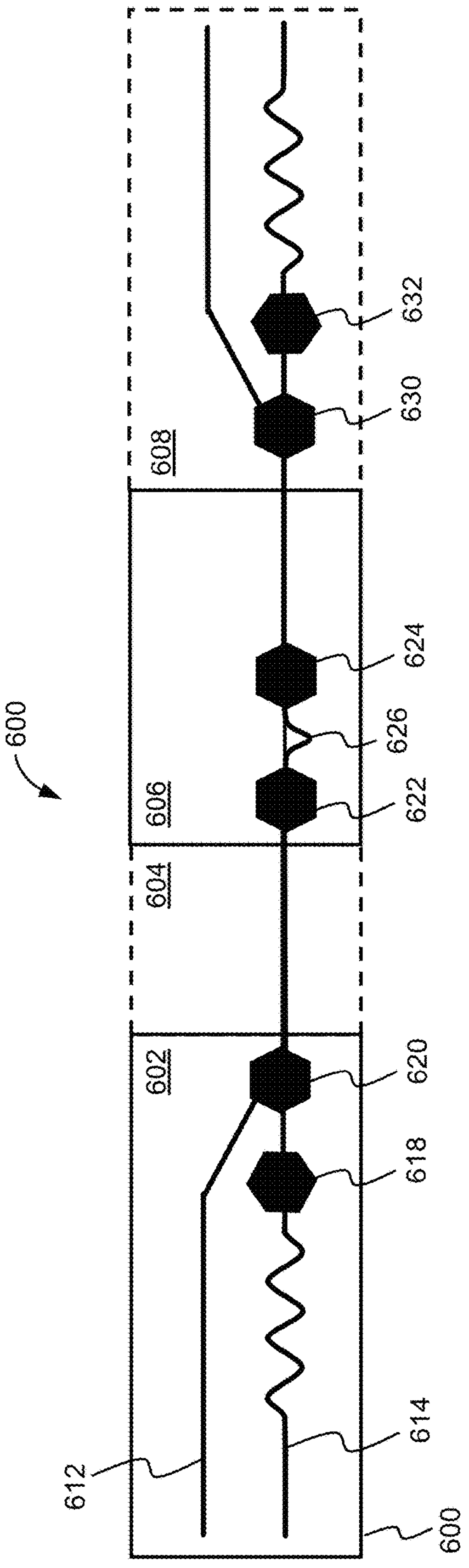
FIGS. 6A-6B are schematic diagrams of an example device comprising multiple connector structures.
Figure 6B:
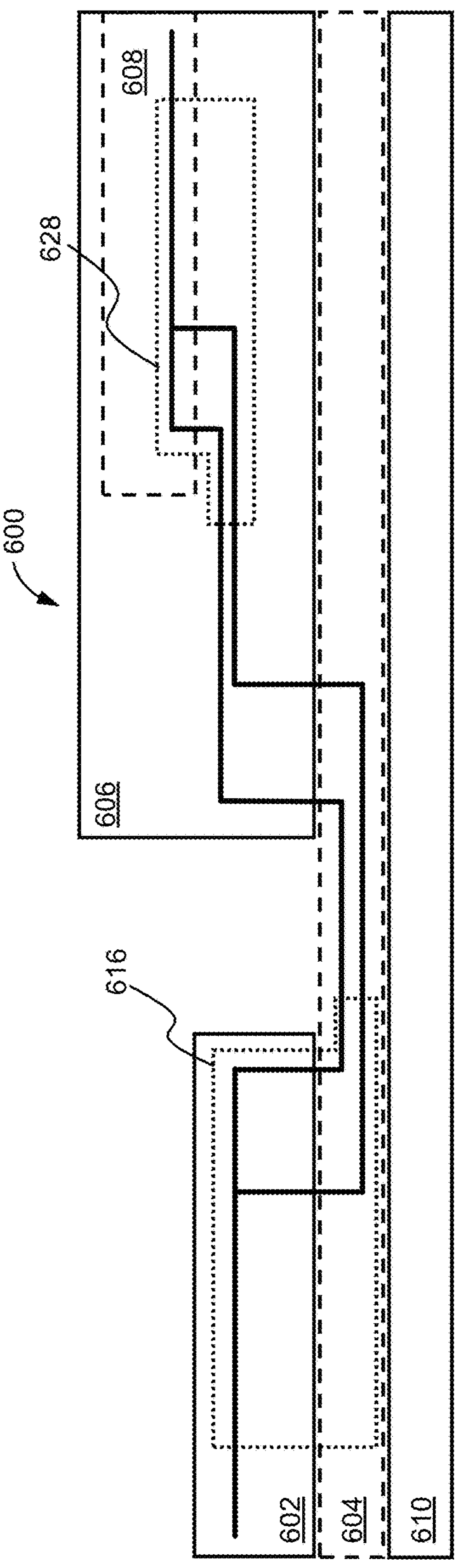

Some devices could also incorporate multiple connector structures to connect transmission lines in several integrated circuit devices and signal carrying structures. FIG. 6A depicts a top view and FIG. 6B depicts a side view of an example device 600 comprising a first integrated circuit device 602, a host material 604, and a package 606 that comprises a second integrated circuit device 608. A carrier 610 serves as the base of the device. Conductor strips 612 and 614 are configured to transmit signals along the length of the device. In the integrated circuit device 602, the conductor strips 612 and 614 are configured in an ECCPS configuration. A connector structure 616 comprising coupling locations 618 and 620 converts the ECCPS configuration to a BCS configuration and the conductor strips 612 and 614 subsequently run through the host material 604. The conductor strips 612 and 614 are coupled to coupling locations 622 and 624 and undergo a vertical transition into package 606. A delay compensation loop 626 can be used to compensate any signal delays associated with this vertical transition. A second transition structure 628 comprising coupling locations 630 and 632 converts the BCS configuration to a ECCPS configuration in the second integrated circuit device 608. The lengths of the conductors 612 and 614 in the transition structures 616 and 628 are configured to compensate for any delays associated with the signals propagating through the device 600.

In some implementations, the use of a connector structure can reduce a signal width, thus increasing conduction losses. To avoid these losses, a connector structure could be implemented at interfaces between components within a device package, as shown in FIG. 6B. Additionally, the package material choice and associated impedance can be limited by the dielectric constant and/or the layer thickness. As the dielectric constant increases for a given impedance, the dielectric layer thickness must increase as well. However, if the layer thickness is too large, unwanted waveguide modes (e.g. TE10) can be excited in a frequency band of interest. The length of the vertical transition can also be important as the delay between the two signals will lead to inductive loading, which might be compensated by the pitch of the vias or their anti-pads.

Figure 7C:
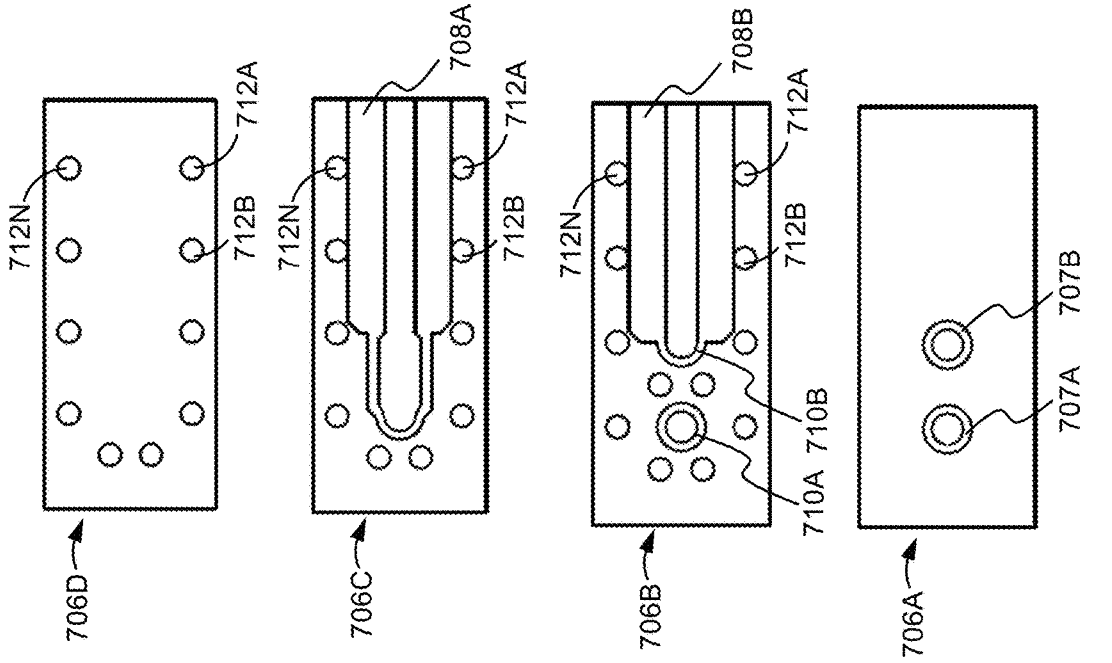
FIGS. 7A-7C are schematic diagrams of an example device comprising a transition structure that includes ground vias.
Figure 7A:
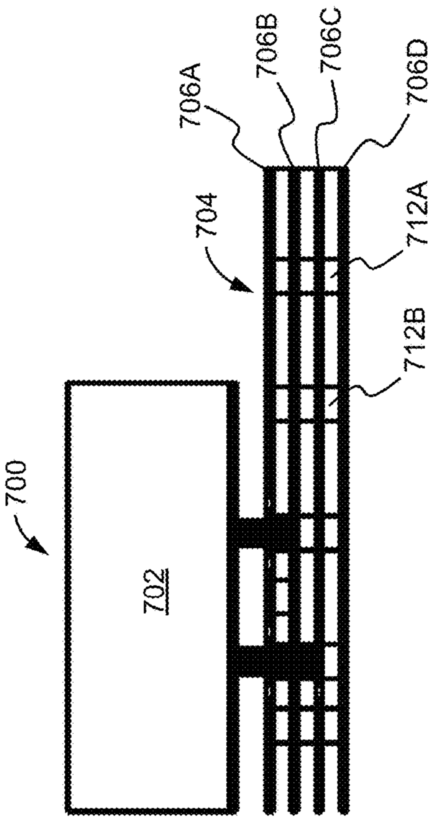
Figure 7B:
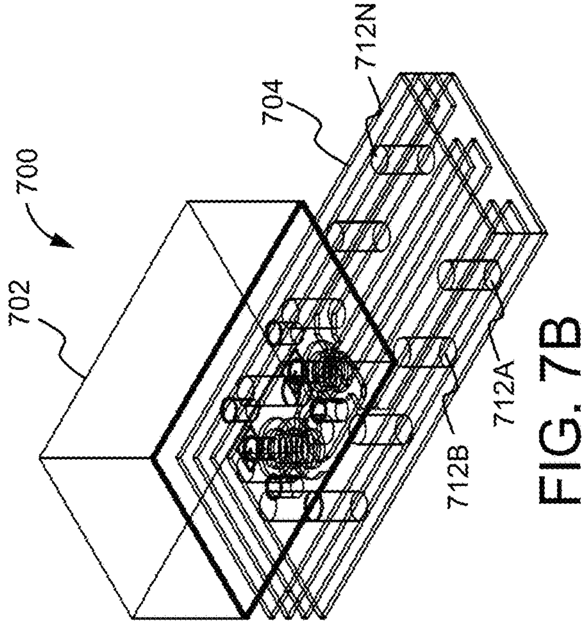

In some connector structures, the second interface can also comprise a plurality of ground vias, with each ground via extending along an axis that is perpendicular to the first plane. FIG. 7A depicts a side view of an example device 700 comprising an integrated circuit device 702 and a portion of a transition structure 704 that is configured to connect to a signal carrying structure (not shown). The portion of the transition structure 704 comprises layers 706A-706D, where each layer 706A-706D is substantially coplanar to respective plane and each respective plane is parallel with each other plane. Slices of the transition structure 704 along each layer 706A-706D are shown in FIG. 7C. The transition structure 704 comprises a first interface configured to connect to the integrated circuit device 702 and a second interface configured to connect to a signal carrying structure (not shown). A portion of the first interface that extends into the integrated circuit device 702 is not shown. The first interface comprises coupling locations 707A and 707B that are coplanar with the plane that is coplanar with the layer 706A. The second interface comprises conductor strips 708A and 708B that have a BCS configuration. Conductor strips 710A and 710B connect each coupling location 707A and 707B to a respective conductor strip 708A and 708B. The second interface comprises a plurality of ground vias 712A-712N where each ground vias 712A-712N extends along an axis that is perpendicular to the plane that is coplanar with the layer 706A. In some implementations, the density of ground vias can impact crosstalk between conductor strips. Some implementations can comprise ground vias with a pitch $<\lambda/4$.

In some implementations, a connector structure can carry a high bandwidth and/or high frequency RF signal chain from a DAC in an electronic integrated circuit (EIC) device to an EIC/driver or photonic integrated circuit. As previously mentioned, utilizing a connector structure can be associated with reduced conduction losses of the high bandwidth RF signal as the signal travels between the EIC and the EIC/driver.

In some implementations, a RF interconnection can be configured to allow for a differential-output driver to feed a coplanar waveguide (CPW) electrode in a push-pull configuration. In some implementations, this configuration can be utilized for linear electro-optical (EO) effect modulators comprising CPW transmission lines.

In some implementations, differential-output drivers can provide advantages compared to single-end output drivers. In some implementations, differential-output drivers can suppress common-mode noise and other impairments, such as like even-order harmonics, present at the DAC/driver channel output. Some differential-output drivers can be associated with increased available swing at the modulator. In some examples, for a fixed swing and fixed modulator/termination resistance, a differential-output driver can be associated with reduced dynamic power consumption at the travelling wave (TW) Mach-Zehnder modulator (MZM) termination. In some implementations, for a prescribed optical phase shift at the TW-MZM, differential-driving can allow for the halving of the swing of each signal within the pair compared to single-ended driving. This reduction can allow for a theoretical 2× reduction in dynamic driver power consumption:

$$2x\frac{(V_{rms}/2)^2}{R_{term}} = \frac{1}{2}\frac{V_{rms}^2}{R_{term}}.$$

In some implementations, differential-output drivers can be associated with reduced static power consumption by reducing the supply voltage since the swing can be shared between two complements of a differential pair. Some differential output drivers can reduce the supply voltage by ½ the swing, while still maintaining the same headroom as single-ended drive. In some implementations, this configuration can allow for unterminated topologies such as Emitter Follower Push Pull (EFPP) and Open-Collector (OC).

Without using the methods disclosed herein, some single-ended driven MZMs can be restricted to Traveling-Wave Amplifiers (TWA) or a terminated Single-Ended driver. In some examples, a single-ended driver can be associated with signal quality issues due to no common-mode noise rejection, lower achievable output swings, doubled dynamic TW-MZM power consumption for the same optical phase shift (power at the MZM termination), doubled driver supply voltage. In addition, without using the methods disclosed herein some push-pull CPW structures can be associated with wire bonding schemes with large variability, signal crossings that can incur crosstalk between conductors, and lossy y branches.

In contrast, in some TW-MZMs, drivers with differential channel outputs can be employed to drive coplanar strip (CPS) or dual coplanar waveguide (CPW) RF electrodes configured to carry a differential signal comprising complementary signals $\overline{S}$, S. Some CPW RF electrodes can comprise layouts such as: $\overline{S}$-S (CPS, 'series push-pull' MZM architecture), G-$\overline{S}$-S-G (dual-CPS), or G-$\overline{S}$-G-S-G (dual-CPW, fully shielded), or variations thereof. Some TW electrode layouts can be utilized in integrated modulator technologies such as indium phosphide (InP) and silicon photonics (SiPhot), which can respectively rely on the quantum-confined Stark effect (QCSE) and plasma dispersion (free-carrier refraction).

Some integrated circuits can comprise linear-phase electro-optic (EO) crystals such as bulk lithium niobate ($LiNbO_3$ or LN), thin-film lithium niobate ($LiNbO_3$ or TFLN, ~X-cut), or barium titanate ($BaTiO_3$ or BTO). In some implementations, devices comprising these materials can be associated with low linear capacitance due to an absence of pn junction loading in the optical waveguides. Further, some integrated circuits can utilize the field-effect nature of these modulators and can rely on RF electrode configurations to drive the modulators. Some RF electrodes can comprise configurations such as G-S-G (single-ended), and $\overline{S}$-S-$\overline{S}$ or G-$\overline{S}$-S-$\overline{S}$-G (differential).

Figure 8:
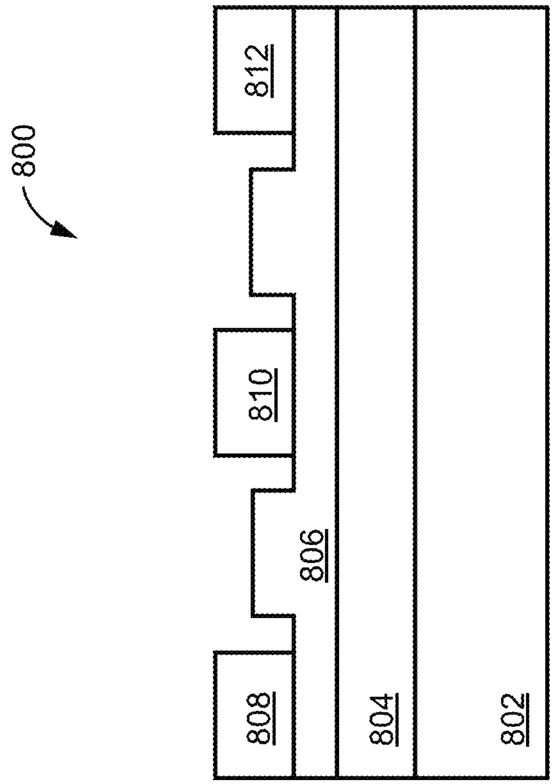
FIG. 8 is a schematic diagram of an example device configured as a modulator.

By way of example, a front view of an example device 800 that can be utilized as a EO modulator is depicted in FIG. 8. The device 800 comprises a first substrate layer 802, a second substrate layer 804, an EO layer 806, and electrodes 808, 810, 812. In some implementations, the first substrate layer 802 can comprise silicon, the second substrate layer 804 can comprise silicon dioxide $SiO_2$, and the EO layer 806 can comprise TFLN. In some single-ended driver configurations, the electrodes 808, 812 can be grounded and the electrode 810 can carry the signal S. In some differential driver configurations, the electrodes 808, 810 can carry the signal $\overline{S}$ and the electrode 810 can carry the complementary signal S. In some implementations, additional ground lines (not shown) can be included in a differential driver.

In some implementations, the driver output pads can be configured to be longitudinal with respect to the signal propagation direction. This configuration can enable more flexibility to route the RF signals without signal crossings. In some examples, configuring the two pads longitudinally can result in a phase delay between P and N signals in transmission lines. In some examples, signals can be routed as single-ended (in anti-phase) in some microstrip or embedded microstrips. Therefore, a delay line can be introduced to one of these microstrips to compensate for the extra length of the other. This delay can also be used to compensate for the additional phase mismatch of the following transition.

From the output of the longitudinal pads in the driver, the signal can be routed through a broadside coupled strip lines (BCS) or a parallel plate transmission line (BCS but without grounds). To achieve a differential mode within the BCS, a path lengths delay associated with both the N and P lines can be configured to be identical. In some implementations, a delay can be added to the shortest line. In some examples, the delay can be easier to implement within the driver since the N and P lines can be routed in uncoupled microstrips. Therefore, a delay line can be implemented without altering the line impedance.

Figure 9A:
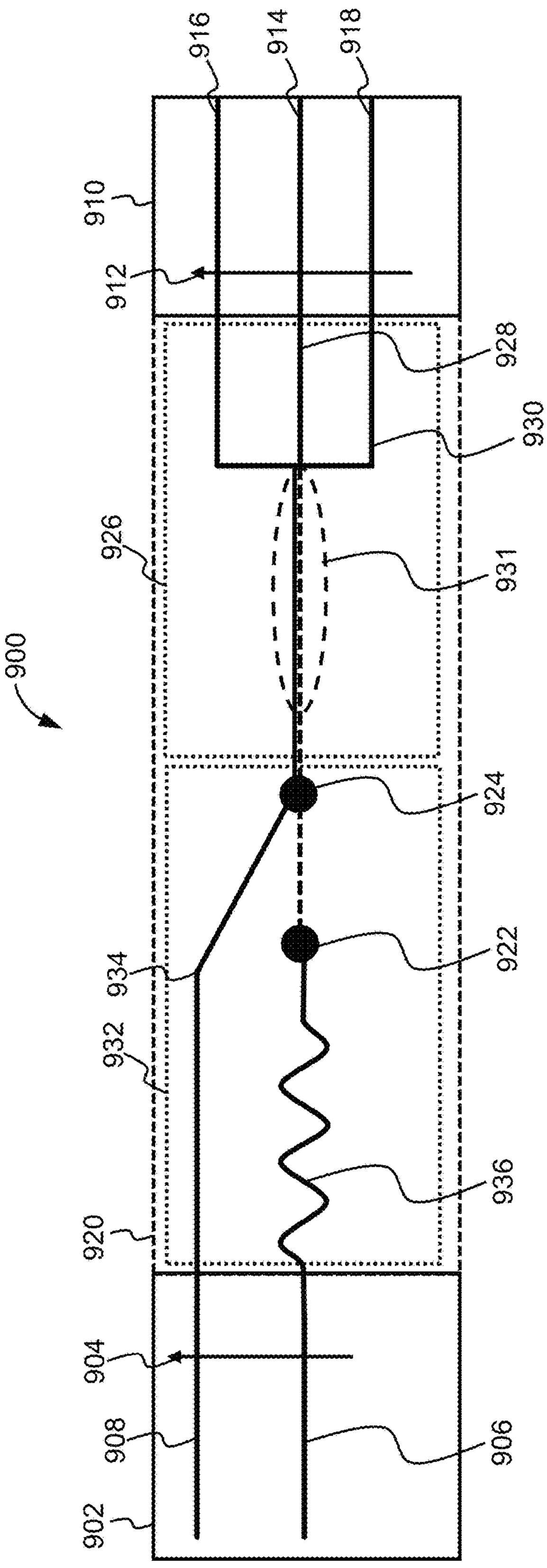
FIGS. 9A-9B are schematic diagrams of an example device comprising an interface transition region.

FIG. 9A depicts a top view of an example device 900. The device 900 comprises a first interface 902 comprising a first set of transmission lines distributed along a first axis 904 contained within a first plane. The first set of transmission lines comprises a first conductor strip 906 and a second conductor strip 908 that are distributed along the first axis 904. The device 900 also comprises a second interface 910 that comprises a second set of transmission lines distributed along a second axis 912 that is contained within a second plane. The second set of transmission lines comprises a third conductor strip 914, a fourth conductor strip 916, and a fifth conductor strip 918 that are distributed along the second axis 912. The device 900 further comprises a transition region 920 between the first interface 902 and the second interface 910. The transition region 920 comprises a first coupling location 922 that is coplanar with the first plane and a second coupling location 924 that is coplanar with the first plane and positioned at a different distance from the second interface 910 than the first coupling location 922. The transition region 920 also comprises a first transition structure 926 comprising a first conductor 928 and a second conductor 930. The first conductor 928 connects the first coupling location 922 to the third conductor strip 914. The second conductor 930 connects the second coupling location 924 to the fourth conductor strip 916 and the fifth conductor strip 918. The transition region 920 further comprises a second transition structure 932 comprising a third conductor 934 and a fourth conductor 936. The third conductor 934 connects the second coupling location 924 to the second conductor strip 908. The fourth conductor 936 connects the first coupling location 922 to the first conductor strip 906. In some examples, the third conductor 934 and the fourth conductor 936 can be configured to at least partially compensate for a delay associated with electromagnetic signals propagating through one or more of: the first transition structure 932, the first conductor strip 906, the second conductor strip 908, the third conductor strip 914, the fourth conductor strip 916, or the fifth conductor strip 918. At least a portion of the second conductor 928 and at least a portion of the first conductor 930 at least partially overlaps with a third plane that is perpendicular to the second axis 912 in the region 931.

Figure 9B:
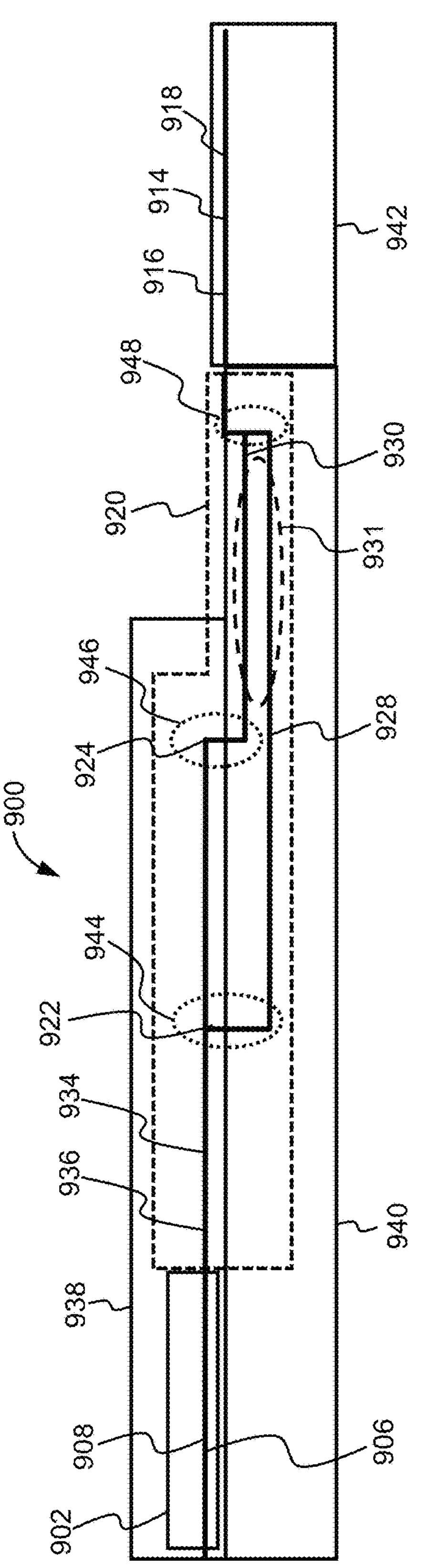

FIG. 9B depicts a side view of the example device 900. As shown in FIG. 9B, the device 900 comprises a first substrate 938, a second substrate 940, and a third substrate 942. As shown in FIG. 9B, at least a portion 944 of the first conductor 928 extends a first distance from the plane containing the first set of transmission lines. Additionally, at least a portion 946 of the second conductor 930 extends to a second distance from the plane containing the first set of transmission lines and a second portion 948 of the first conductor 928 extends to a distance from the second plane. The third conductor 936 and the fourth conductor 934 are coplanar with the plane containing the first set of transmission lines.

In some implementations, the first substrate 938 can be associated with an integrated circuit device configured as an EIC, the second substrate 940 can be a host material, and the third substrate 942 can be associated with a PIC. In some implementations, the third conductor strip 914 can be configured to carry a signal S while the fourth conductor strip 916 and the fifth conductor strip 918 can each be configured to carry a complementary signal S.

In some implementations, a conductor of a transition region can comprise one or more conductive structures. In some implementations, these conductive structures can comprise conductor strips or conductive separating structures. Some conductor strips can comprise parallel plate transmission lines or broadside coupled striplines. Some conductive separating structures can be solder bumps.

In some implementations, the coupling locations 922, 924 can be contact pads configured to provide electrical connections between two substrates coupled together (e.g., in a flip-chip configuration). In some examples, positioning the contact pads along the propagation path of the signal can allow for smooth transition to a differentially driven CPW. In some implementations, the coupling locations 922, 924 can comprise portions of conductor strips or conductors.

Figure 10A:
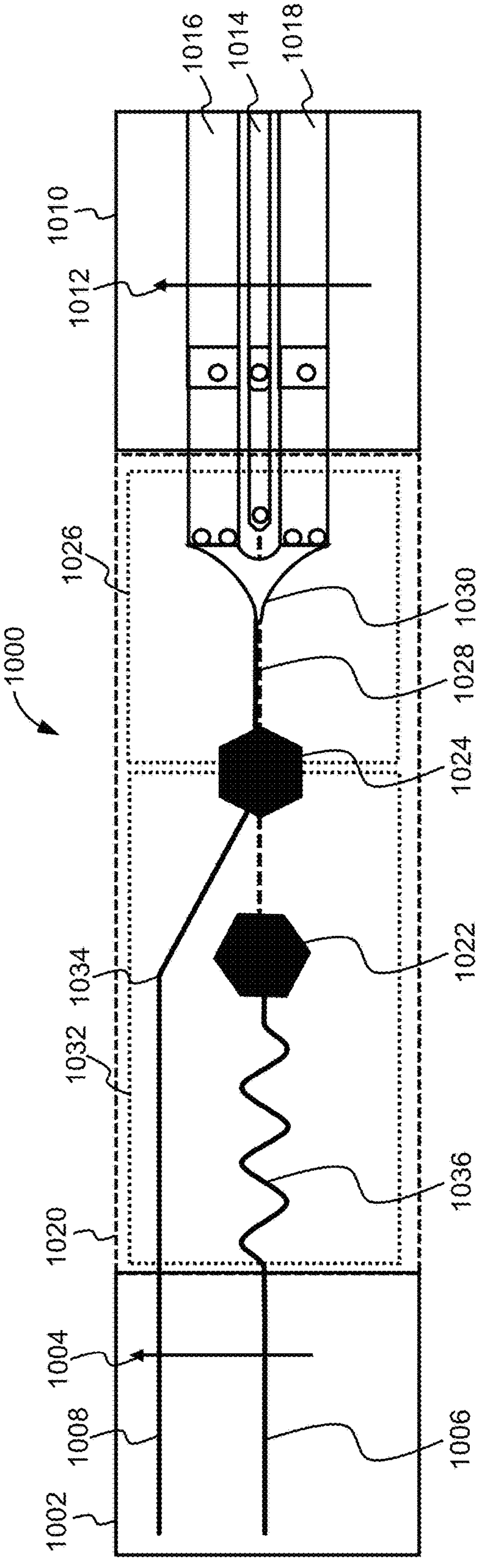
FIGS. 10A-10B are schematic diagrams of an example device comprising an interface transition region.

FIG. 10A depicts a top view of an example device 1000. The device 1000 comprises a first interface 1002 comprising a first set of transmission lines distributed along a first axis 1004 contained within a first plane. The first set of transmission lines comprises a first conductor strip 1006 and a second conductor strip 1008 that are distributed along the first axis 1004. The device 1000 also comprises a second interface 1010 that comprises a second set of transmission lines distributed along a second axis 1012 that is contained within a second plane. The second set of transmission lines comprises a third conductor strip 1014, a fourth conductor strip 1016, and a fifth conductor strip 1018 that are distributed along the second axis 1012. The device 1000 further comprises a transition region 1020 between the first interface 1002 and the second interface 1010. The transition region 1020 comprises a first coupling location 1022 that is coplanar with the first plane and a second coupling location 1024 that is coplanar with the first plane and positioned at a different distance from the second interface 1010 than the first coupling location 1022. In this example, the coupling locations 1022, 1024 are contact pads configured to provide electrical connections between two substrates coupled together (e.g., in a flip-chip configuration). The transition region 1020 also comprises a first transition structure 1026 comprising a first conductor 1028 and a second conductor 1030. The first conductor 1028 connects the first coupling location 1022 to the third conductor strip 1014. The second conductor 1030 connects the second coupling location 1024 to the fourth conductor strip 1016 and the fifth conductor strip 1018. Each conductor 1030, 1028 comprises bumps which are represented as solid circles. The transition region 1020 further comprises a second transition structure 1032 comprising a third conductor 1034 and a fourth conductor 1036. The third conductor 1034 connects the second coupling location 1024 to the second conductor strip 1008. The fourth conductor 1036 connects the first coupling location 1022 to the first conductor strip 1006.

Figure 10B:
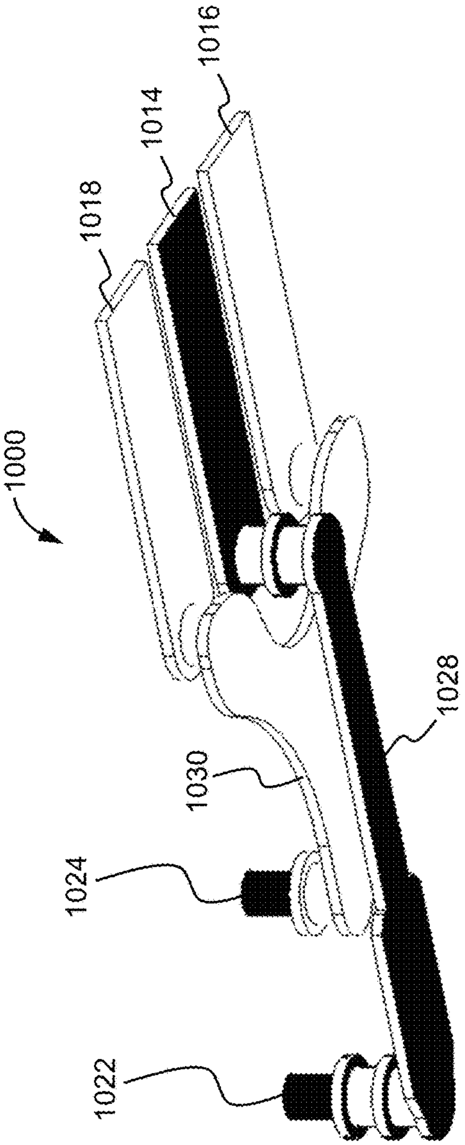

FIG. 10B depicts an isomorphic view of a portion of the device 1000. As shown in FIG. 10B, the second conductor 1030 comprises a y-branch structure configured to distribute a signal to the fourth conductor strip 1016 and the fifth conductor strip 1018. In a BCS to CPW transition, a y-branch can be used similarly to a BCS to microstrip line. Since these two transmission lines can have strong modal overlap, little energy can be lost to mode conversion. For the two-step CPW transition, the y-branch can be included in the second via discontinuity. Furthermore, driver design rules can allow for a transition design to be smaller than the highest frequency wavelength (100-150 GHz). A y-branch can be co-designed with the pads transition and have negligible loss.

Some TFLN modulators can have no direct current (DC) bias on their electrodes. Therefore, some drivers can utilize external DC blocking capacitance or bias-tees. These external devices can be introduced as embedded capacitors buried within the RF interconnect/host material. In some implementations, the embedded capacitors can be buried within the RF interconnect/host material with the broadside coupled strip line. Another possibility is to use three surface mount capacitors on the push-pull CPW. In this case, a capacitor can be placed on each arm of the CPW, for instance the conductor strips 1014, 1016, 1018 in FIG. 10A.

In some implementations, a differential RF field propagating through the transition region can evolve continuously from a BCS to CPW mode.

Some transition structures and devices can comprise side grounds positioned near the signal lines. In some implementations, omitting grounds can reduce the risk of exciting unwanted modes within the G$\overline{S}$S$\overline{S}$G region. In some implementations, omitting grounds can allow for the possibility to add crosstalk mitigation measures such as ground via wall. In some implementations, a common mode termination can be included to terminate the driver.

Figure 11A:
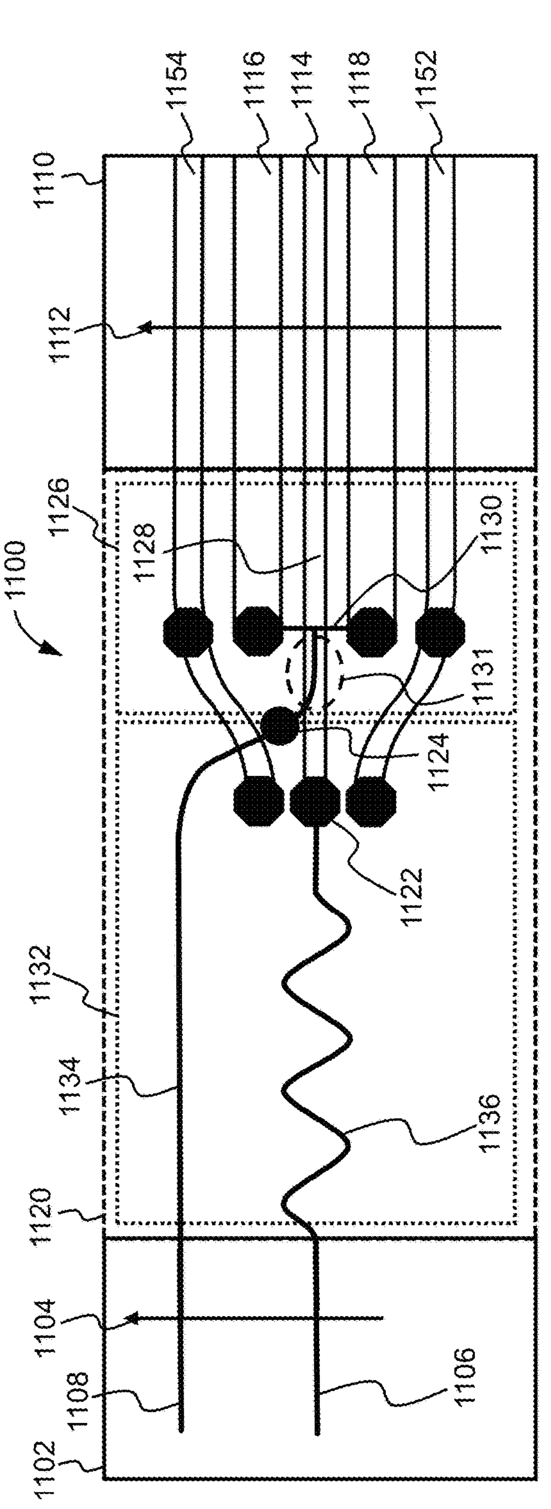
FIGS. 11A-11B are schematic diagrams of an example device comprising an interface transition region.
Figure 11B:
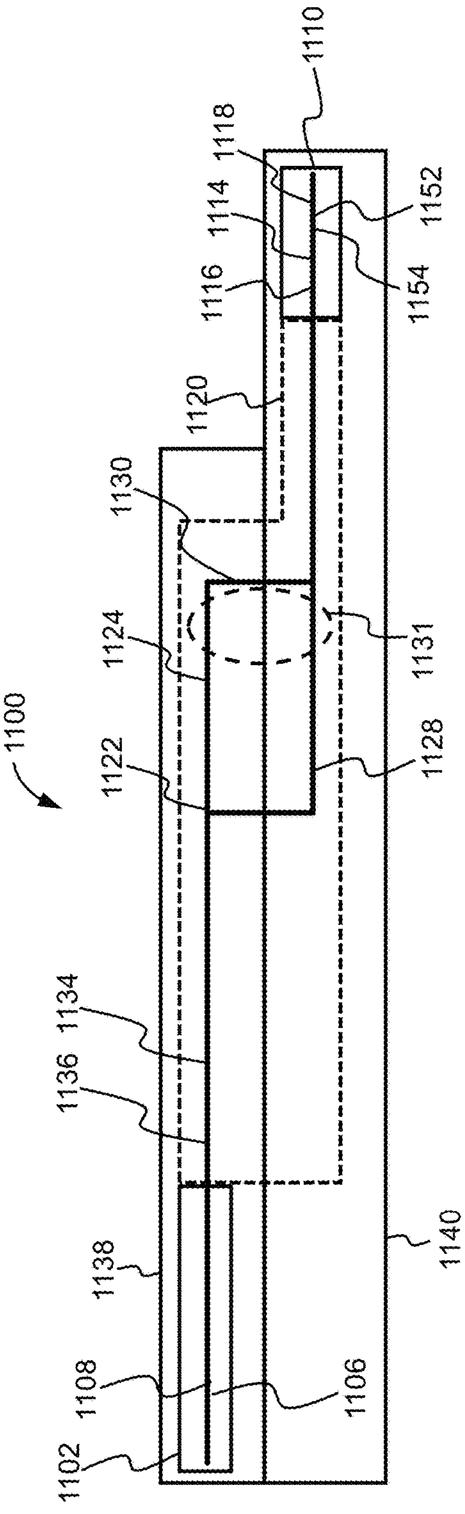

FIG. 11A depicts a top view of an example device 1100. The device 1100 comprises a first interface 1102 comprising a first set of transmission lines distributed along a first axis 1104 contained within a first plane. The first set of transmission lines comprises a first conductor strip 1106 and a second conductor strip 1108 that are distributed along the first axis 1104. The device 1100 also comprises a second interface 1110 that comprises a second set of transmission lines distributed along a second axis 1112 that is contained within a second plane. The second set of transmission lines comprises conductor strips 1114, 1116, 1118, 1152, 1154 that are distributed along the second axis 1112. The device 1100 further comprises a transition region 1120 between the first interface 1102 and the second interface 1110. The transition region 1120 comprises a first coupling location 1122 that is coplanar with the first plane and a second coupling location 1124 that is coplanar with the first plane and positioned at a different distance from the second interface 1110 than the first coupling location 1122. The transition region 1120 also comprises a first transition structure 1126 comprising a first conductor 1128 and a second conductor 1130. The first conductor 1128 connects the first coupling location 1122 to the conductor strip 1114. The second conductor 1130 connects the second coupling location 1124 to the conductor strip 1116 and the conductor strip 1118. The transition region 1120 further comprises a second transition structure 1132 comprising a third conductor 1134 and a fourth conductor 1136. The third conductor 1134 connects the second coupling location 1124 to the second conductor strip 1108. The fourth conductor 1136 connects the first coupling location 1122 to the first conductor strip 1106. FIG. 11B depicts a side view of the example device 100. The device 1100 comprises a first substrate 1138 and a second substrate 1140. At least a portion of the second conductor 1130 and at least a portion of the first conductor 1128 at least partially overlaps with a third plane that is perpendicular to the second axis 1112 in the region 1131.

In some implementations, the second interface can be an RF interconnect. In some implementations, the first conductor strip 1106 and the fourth conductor 1136 can be configured to carry a signal ($\overline{S}$) that can routed to conductor 1128 and conductor strip 1114 of the RF interconnect through a bump, in this example the first coupling location 1122. The second conductor strip 1108, the third conductor 1134, and conductor strips 1116, 1118 can each be configured to carry a complementary signal S. This signal S can be routed to two bumps, either via a "Y" branch or one pad large enough to host two bumps. In some examples, the spacing between these S bumps can be large enough to allow for the $\overline{S}$ signal electrode to be routed in between then in the RF interconnect. The device 1100 also comprises conductor strips 1152 and 1154 that can be configured as ground.

In some examples, the implementations described herein can be associated with one metal layer. In some implementations, structures can be implemented on a simple ceramic carrier or directly on the linear Pockels modulator die.

In some implementations omitting ground lines, the RF field can evolve continuously from the driver output to the CPW mode. Some implementations comprising ground lines can be associated with coupling between the S and G electrodes. This coupling can excite a propagating mode that has no electro-optic contribution and can reduce modulator efficiency. In some examples, designing the geometry of this transition can avoid unwanted modal conversion.

In some implementations, a driver can be self-biased and can output the same DC voltage on each complement within a tight tolerance (e.g. <0.05V). In such implementations, DC-blocking capacitors can be omitted between the driver chip and the modulator chip (on the driver chip, interconnect, nor on the modulator chip) to prevent DC voltage imbalances across optical waveguides and the associated phase drift.

Figure 12:
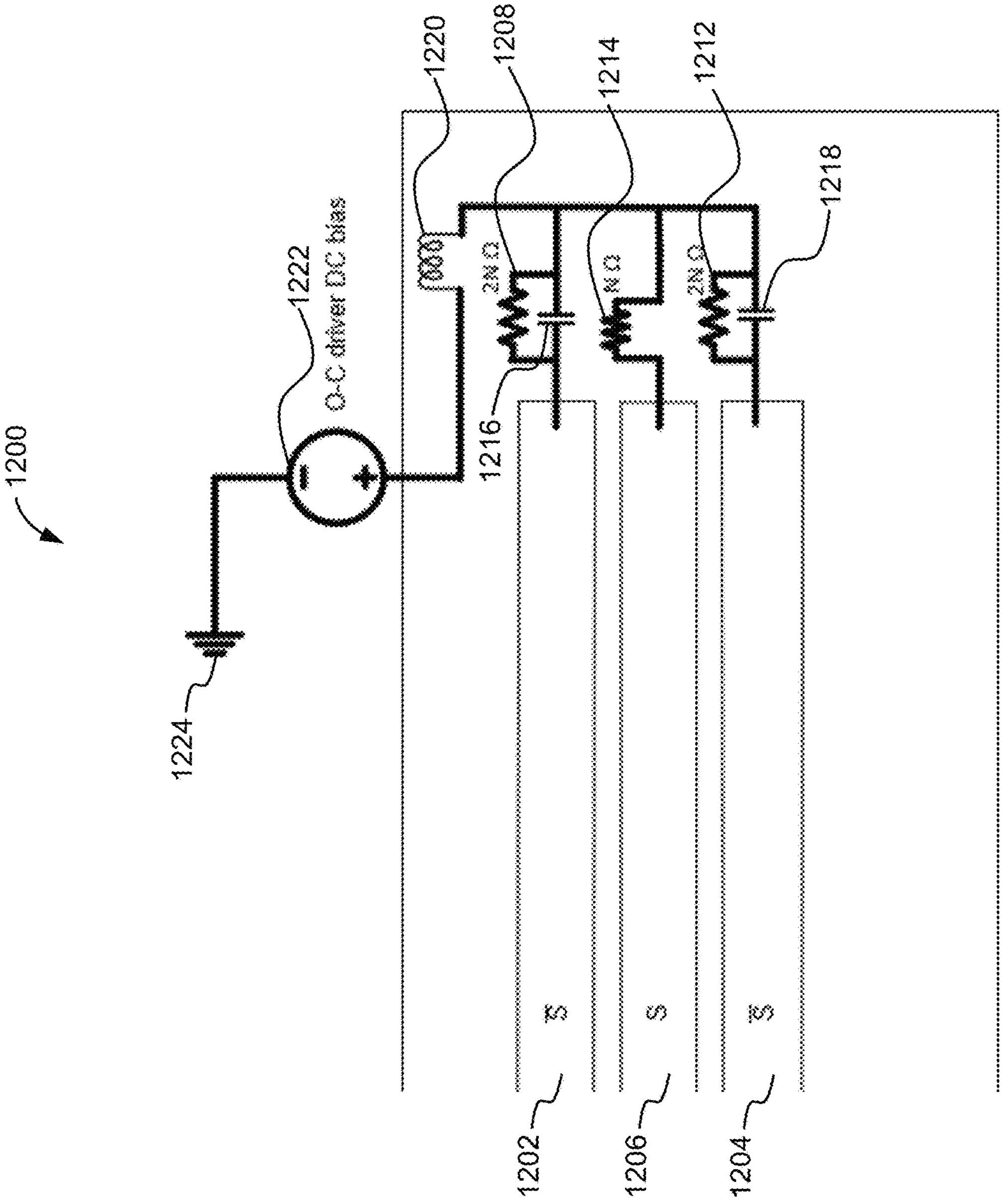
FIG. 12 is a schematic diagram of an example configuration for terminating transmission lines.

In some implementations, a driver chip can be configured as an open-collector. In such implementations, a DC bias tee or RF termination architecture can be implemented on the far side of the modulator. In some examples, a termination network can allow for use with a open-collector driver amplifier architecture that can use RF output DC biasing. An example architecture 1200 that can be utilized as a DC bias tee or RF termination architecture is depicted in FIG. 12. In some examples, the architecture 1200 can be included on a modulator chip or on a carrier or on some combination thereof. The architecture 1200 comprises conductor strips 1202, 1204, each configured to carry a signal $\overline{S}$, and a conductor strip 1206 configured to carry a complementary signal S. The architecture 1200 further comprises resistors 1208, 1210 that are each associated with a resistance of 2N Ohms and a resistor 1214 that is associated with a resistance of N Ohms. In some implementations, N can be close to $\mathrm{Re}\{Z_{diff}\}$ associated with an MZM. The architecture 1200 further comprises capacitors 1216, 1218 each associated with capacitance C. In some implementations, C can be set according to impedance matching criteria at low frequency, in-band capacitor impedance Zc<<N. The architecture 1200 further comprises an inductor 1220 associated with an inductance L. In some examples, L can be high enough to be close to an ideal choke preventing RF from propagating into the bias circuit. The architecture 1200 also includes a driver DC bias 1222 connected to ground 1224.

In some implementations, the resistors 1208, 1212, 1214, the capacitors 1216, 1218, and the inductor 1220 can be integrated on an optical chip. Some driver architectures can not use RF output DC biasing, i.e., if the architecture is not an open-collector, such that the resistors 1208, 1212, the capacitors 1216, 1218, and the inductor 1220 can be omitted.

In some implementations, configuring a transition region can be associated with smooth mode conversion. Furthermore, lines can stay coupled from the driver output onwards, which can reduce the risk of having directional coupling effects. In some examples, use of transition regions can be associated with better signal integrity delivered to a TW-MZM, and higher SNR, which can increase propagation distance or modulation format complexity by allowing higher throughput. Some transition regions can be associated with a larger dynamic swing delivered to the TW-MZM by increasing optical modulation amplitude (OMA) or lowering modulation loss. This dynamic swing can enable higher-order formats through better SNR, and higher average optical power transmitted. In some examples, a peak-peak swing increase at the MZM input can be a factor of 2, minus the excess loss of the interconnect. In some examples, differential CMOS inverters with lower swing can be used to drive MZMs without the use of an external driver. Using inverters can be associated with reduced cost, module footprint, and energy savings. In some examples, using a differential drive can offer a reduction in common mode artifacts and imbalances from a single-ended drive with only one compliment from a differential DAC.

As summarized in the abstract, in one aspect, in general, an apparatus comprises: a first interface comprising one or more edge-coupled coplanar striplines distributed along a first axis, where each edge-coupled coplanar stripline comprises at least two conductor strips; a second interface comprising one or more edge-coupled striplines distributed along a second axis, where each edge-coupled stripline comprises at least three conductor strips; and a transition region between the first interface and the second interface, the transition region comprising a transition structure comprising different respective conductors connecting each conductor strip of an edge-coupled coplanar stripline of the first interface to one or more respective conductor strips of a corresponding edge-coupled stripline of the second interface, wherein at least a portion of the transition structure comprises broad-side coupled conductors.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus comprising:

a first interface comprising a first set of transmission lines distributed along a first axis that is contained within a first plane, the first set of transmission lines comprising a first conductor strip and a second conductor strip that are distributed along the first axis and are substantially coplanar with the first plane;

a second interface comprising a second set of transmission lines distributed along a second axis that is contained within a second plane, wherein the second set of transmission lines comprises a third conductor strip, a fourth conductor strip, and a fifth conductor strip that are distributed along the second axis, and the second plane is substantially parallel to the first plane; and a transition region between the first interface and the second interface, the transition region comprising a first coupling location coplanar with the first plane, a second coupling location coplanar with the first plane and positioned at a different distance from the second interface than the first coupling location, a first transition structure comprising a first conductor, wherein at least a portion of the first conductor extends to a first distance from the first plane and the first conductor connects the first coupling location to the third conductor strip, and a second conductor, wherein at least a portion of the second conductor extends to a second distance from the first plane and the second conductor connects the second coupling location to the fourth conductor strip and the fifth conductor strip, and a second transition structure comprising a third conductor coplanar with the first plane and connecting the second coupling location to the second conductor strip, and a fourth conductor coplanar with the first plane and connecting the first coupling location to the first conductor strip;

wherein at least a portion of the second conductor and at least a portion of the first conductor at least partially overlaps with a third plane that is perpendicular to the second axis.

2. The apparatus of claim 1, wherein the third conductor and the fourth conductor are configured to at least partially compensate for a delay associated with electromagnetic signals propagating through one or more of: the first transition structure, the first conductor strip, the second conductor strip, the third conductor strip, the fourth conductor strip, or the fifth conductor strips.

3. The apparatus of claim 1, wherein at least a second portion of the second conductor extends to a third distance from the second plane.

4. The apparatus of claim 1, wherein the first interface and the second transition structure comprise a first material having a first dielectric constant, the first transition structure comprises a second material having a second dielectric constant, and the second interface comprises a third material having a third dielectric constant.

5. The apparatus of claim 4, wherein the first dielectric constant, the second dielectric constant, and the third dielectric constant are different and the third conductor and the fourth conductor are configured to at least partially compensate for a delay associated with electromagnetic signals propagating through the first material, the second material, and the third material.

6. The apparatus of claim 4, wherein the second dielectric constant and the third dielectric constant are equal.

7. The apparatus of claim 1, wherein each of the third conductor strip, the fourth conductor strip, and the fifth conductor strip comprise a respective capacitor.

8. The apparatus of claim 1, wherein each of the first conductor and the second conductor comprise a respective capacitor.

9. The apparatus of claim 1, wherein the first coupling location is arranged along a third axis that is coplanar with the first plane and substantially parallel to an axis that contains the portion of the second conductor that overlaps with the portion of the first conductor in the third plane.

10. The apparatus of claim 9, wherein the second coupling location is arranged along the third axis.

11. The apparatus of claim 1, wherein the portion of the second conductor that overlaps with the first conductor in the third plane comprises a y-branch structure configured to distribute a signal propagating in the second conductor to the fourth conductor strip and the fifth conductor strip.

12. The apparatus of claim 1, wherein the first coupling location and the second coupling location each comprise respective metal contacts.

13. The apparatus of claim 1, wherein the second axis is substantially parallel to the first axis.

14. The apparatus of claim 1, wherein the third conductor strip is configured to carry a first signal and each of the fourth conductor strip and the fifth conductor strip are configured to carry a respective second signal and third signal, where the second signal and the third signal are complementary signals of the first signal.

15. The apparatus of claim 1, wherein the second set of transmission lines comprises a first ground strip and a second ground strip that are substantially coplanar with the second plane and arranged along the second axis.

16. A method comprising:

forming a first interface comprising a first set of transmission lines distributed along a first axis that is contained within a first plane, the first set of transmission lines comprising a first conductor strip and a second conductor strip that are distributed along the first axis and are substantially coplanar with the first plane;

forming a second interface comprising a second set of transmission lines distributed along a second axis that is contained within a second plane, wherein the second set of transmission lines comprises a third conductor strip, a fourth conductor strip, and a fifth conductor strip that are distributed along the second axis, and the second plane is substantially parallel to the first plane; and forming a transition region between the first interface and the second interface, the transition region comprising a first coupling location coplanar with the first plane, a second coupling location coplanar with the first plane and positioned at a different distance from the second interface than the first coupling location, a first transition structure comprising a first conductor, wherein at least a portion of the first conductor extends to a first distance from the first plane and the first conductor connects the first coupling location to the third conductor strip, and a second conductor, wherein at least a portion of the second conductor extends to a second distance from the first plane and the second conductor connects the second coupling location to the fourth conductor strip and the fifth conductor strip, and a second transition structure comprising a third conductor coplanar with the first plane and connecting the second coupling location to the second conductor strip, and a fourth conductor coplanar with the first plane and connecting the first coupling location to the first conductor strip;

wherein at least a portion of the second conductor and at least a portion of the first conductor at least partially overlaps with a third plane that is perpendicular to the second axis.

17. The method of claim 16, wherein the third conductor and the fourth conductor are configured to at least partially compensate for a delay associated with electromagnetic signals propagating through one or more of: the first transition structure, the first conductor strip, the second conductor strip, the third conductor strip, the fourth conductor strip, or the fifth conductor strips.

18. The method of claim 16, wherein at least a second portion of the second conductor extends to a third distance from the second plane.

19. The method of claim 16, wherein the first coupling location is arranged along a third axis that is coplanar with the first plane and substantially parallel to an axis that contains the portion of the second conductor that overlaps with the portion of the first conductor in the third plane.

20. An apparatus comprising:

a first interface comprising one or more edge-coupled coplanar striplines distributed along a first axis, where each edge-coupled coplanar stripline comprises at least two conductor strips;

a second interface comprising one or more edge-coupled striplines distributed along a second axis, where each edge-coupled stripline comprises at least three conductor strips; and a transition region between the first interface and the second interface, the transition region comprising a transition structure comprising different respective conductors connecting each conductor strip of an edge-coupled coplanar stripline of the first interface to one or more respective conductor strips of a corresponding edge-coupled stripline of the second interface, wherein at least a portion of the transition structure comprises broad-side coupled conductors.

* * * * *